(12) United States Patent
McMahon

(10) Patent No.: US 11,344,997 B1
(45) Date of Patent: *May 31, 2022

(54) KNIFE GAUGE

(71) Applicant: Rhineland Cutlery, LLC, Melbourne, FL (US)

(72) Inventor: Phillip J. McMahon, Melbourne, FL (US)

(73) Assignee: Angle Pro Sharpener LLC, Melbourne, FL (US)

( * ) Notice: Subject to any disclaimer, the term of this patent is extended or adjusted under 35 U.S.C. 154(b) by 60 days.

This patent is subject to a terminal disclaimer.

(21) Appl. No.: 16/943,254

(22) Filed: Jul. 30, 2020

Related U.S. Application Data

(62) Division of application No. 16/734,039, filed on Jan. 3, 2020.

(51) Int. Cl.
*B24D 15/08* (2006.01)
*G01B 3/56* (2006.01)
*B24B 3/54* (2006.01)

(52) U.S. Cl.
CPC .............. *B24D 15/081* (2013.01); *B24B 3/54* (2013.01)

(58) Field of Classification Search
CPC .... B24B 3/00; B24B 3/36; B24B 3/54; B24B 15/081; B24B 3/58; B24B 23/08;
(Continued)

(56) References Cited

U.S. PATENT DOCUMENTS

| 79,546 A | 7/1868 | Bulgin | |
| 457,965 A * | 8/1891 | Bradford | B24D 15/081 |
| | | | 76/86 |

(Continued)

FOREIGN PATENT DOCUMENTS

EP 0957331 11/1999

OTHER PUBLICATIONS

Simple Little Life, Handy tool for the knife-maker https://www.youtube.com/watch?v=LrMrPJfZCgs), dated Sep. 11, 2018 (Year: 2018).*

(Continued)

*Primary Examiner* — Ghassem Alie
(74) *Attorney, Agent, or Firm* — Brian S. Steinberger; Hilary F. Steinberger; Law Offices of Brian S. Steinberger, P.A.

(57) ABSTRACT

Systems, devices, and methods for providing different types of sharpeners for knives with a removable angle gauge to determine which knife sharpener to use for individual knives. The sharpener can include three angle sizes of honing ceramic dual wheel sharpeners, three angle sizes of edge shaving diamond coated dual wheel sharpeners, and three angle sizes of new edge blade tungsten rod sharpeners. One angle size can cover approximately 13 degrees to approximately 15 degrees, and include 14 degrees. An angle size can cover approximately 16 degrees to approximately 18 degrees and include 17 degrees. And a third angle size can cover approximately 19 degrees to approximately 21 degrees and include 20 degrees. The removable angle gauge can be a generally rectangular plate with a plurality of grooves, that cover an approximately 13 degree groove, an approximately 14 degree groove, an approximately 15 degree groove, an approximately 16 degree groove, an approximately 17 degree groove, an approximately 18 degree groove, an approximately 19 degree groove, an approximately 20 degree groove, and an approximately 21 degree groove.

15 Claims, 21 Drawing Sheets

(58) Field of Classification Search
CPC ......... B24B 15/00; B24B 15/08; B24B 49/16; G01B 3/56; B24D 15/06; B24D 15/082; B24D 15/066; B24D 18/00; B24D 5/04
USPC ............ 76/86, 82, 88, 87, 89; 451/319, 486, 451/549, 552, 555, 557, 45, 558, 545, 451/349, 267, 43, 193, 241, 234, 278, 451/371, 357; D8/63, 90, 91, 92, 93
See application file for complete search history.

(56) References Cited

U.S. PATENT DOCUMENTS

| | | | | |
|---|---|---|---|---|
| 1,860,174 | A | 5/1932 | Cronk | |
| 3,034,264 | A * | 5/1962 | Mcmaster | B24B 3/54 451/241 |
| 3,234,823 | A * | 2/1966 | Lizak | B24D 15/065 76/86 |
| 3,289,498 | A * | 12/1966 | Pleasants | B24D 15/082 76/87 |
| 3,332,173 | A | 7/1967 | McMaster et al. | |
| 3,583,104 | A * | 6/1971 | Petroske | B24B 3/54 451/241 |
| D240,511 | S | 7/1976 | Granberg | |
| 4,441,279 | A | 4/1984 | Storm et al. | |
| 4,497,412 | A | 2/1985 | Labelle | |
| 4,561,548 | A | 12/1985 | Call | |
| 4,807,399 | A * | 2/1989 | Friel | B24B 3/54 451/267 |
| D312,796 | S | 12/1990 | Parker | |
| D342,684 | S | 12/1993 | Halo | |
| 5,611,726 | A | 3/1997 | Friel et al. | |
| 6,039,642 | A * | 3/2000 | Collins | B24D 15/06 451/45 |
| D426,474 | S | 6/2000 | Chang | |
| 6,802,763 | B1 * | 10/2004 | Leung | B24B 49/16 451/193 |
| 7,077,928 | B2 * | 7/2006 | Bethune | B31D 1/021 156/248 |
| 7,121,177 | B2 * | 10/2006 | Hatano | B26D 7/015 83/13 |
| 7,172,500 | B1 * | 2/2007 | Wu | B24D 15/081 451/319 |
| D575,124 | S | 8/2008 | Smith | |
| D600,147 | S | 9/2009 | Trainello | |
| D629,273 | S | 3/2010 | Friel | |
| D680,399 | S | 4/2013 | Elek et al. | |
| D680,846 | S | 4/2013 | Smith | |
| D681,416 | S | 5/2013 | Masalin | |
| 8,585,462 | B2 | 11/2013 | Jensen et al. | |
| 8,590,427 | B2 | 11/2013 | Murphy et al. | |
| D699,534 | S | 2/2014 | Elek | |
| 8,678,882 | B1 | 3/2014 | Huber et al. | |
| D705,625 | S | 5/2014 | Huber et al. | |
| 8,721,403 | B2 * | 5/2014 | Welch | B24D 15/084 451/552 |
| 8,864,554 | B2 * | 10/2014 | Masalin | B24B 3/54 451/545 |
| 9,138,850 | B2 * | 9/2015 | Walker | B24B 3/54 |
| 9,168,627 | B2 * | 10/2015 | Elek | B24D 15/08 |
| 9,333,613 | B2 | 5/2016 | Friel, Sr. et al. | |
| 9,693,644 | B1 | 7/2017 | Liu et al. | |
| 10,220,490 | B2 | 3/2019 | Wu | |
| D911,809 | S * | 3/2021 | Wu | B24D 15/08 D8/93 |
| 2008/0307686 | A1 * | 12/2008 | Wade | B65C 9/1896 40/638 |
| 2015/0099430 | A1 * | 4/2015 | Rowe | B24D 15/08 451/45 |
| 2019/0358763 | A1 | 11/2019 | Hessler et al. | |

OTHER PUBLICATIONS

Angle Setter for Sharpening System Tormek WM-200 Angle master Amazon.com https://www.amazon .com/Sharpening-Tormek-WM-200-Master-Systems/dp/B00149L55K/ref=sr_1_16dchild=1 keywords=knife+angle+finderqid=1612789226 sr=8-16 Nov. 30, 2009 (year 2009), 3 pages.

Rhineland Cutlery Founder Invents Revolutionary Anglepro Knife Sharpener https://www.buffalonynews.net/news/266475754/rhineland-cutlery-founder-invents-revolutionary-angleprotrade-knife-sharpener Posted Sep. 23, 2020 (Year: 2020), 2 pages.

Tipu Bevel Gauge Amazon.com https://www.amazon.com/TIPU-Tipu-Bevel-Gauge/dp/B075WYF6RZ Sep. 25, 2017 (Year: 2017), 3 pages.

"Audacious Concept Dog Tag Angle Finder-Heinnie Haynes Show for scale" (Heinnie Haynes)(online)(retrieved from the internet on Oct. 23, 2020)<URLhttps://www.youtube.com/watch?v=41kEQcc_qlQ>, Feb. 26, 2018 (Feb. 26, 2018); 3 pages.

"Swiss Army Explorer Knife with Pouch" (REI coop)(online)(retrieved from the internet on Dec. 15, 2020)<URL https://www.rei.com/product/794753/swiss-army-explorer-knife-with-product>2010 (2010); 2 pages.

"Professional Knife Sharpener, 3 Stage Diamond Ceramic Tungsten Steel Handheld Knives Sharpening Afilador De Cuchillos" (All Win-Houseware W){online)(retrieved from the internet on Oct. 23, 2020)<URL https://www.amazon.com/Professional-Sharperner-Tungesten-Sharpening-Cuchillos/dp/B074HG6LKN>, Aug. 24, 2018 (Aug. 24, 2018); 10 pages.

"Angle Pro Sharpener Explainer Video" (AnglePro){online} (retrieved from the internet on Oct. 26, 2020)<URL https://www.youtube.com/watch?vY114BxND_Gc>,Jul. 20, 2020 (Jul. 20, 2020), 1page.

Phillip J. McMahon; PCT Application No. PCT/US20/48331 filed Aug. 28, 2020, PCT Search Report dated Feb. 26, 2021, 14 pages.

* cited by examiner

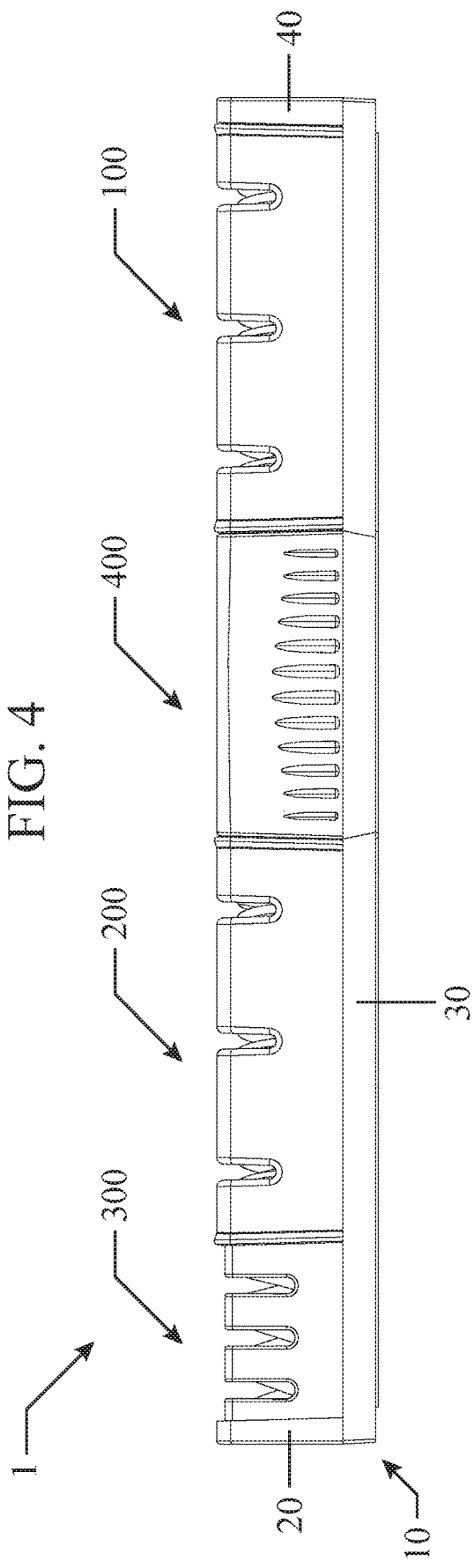
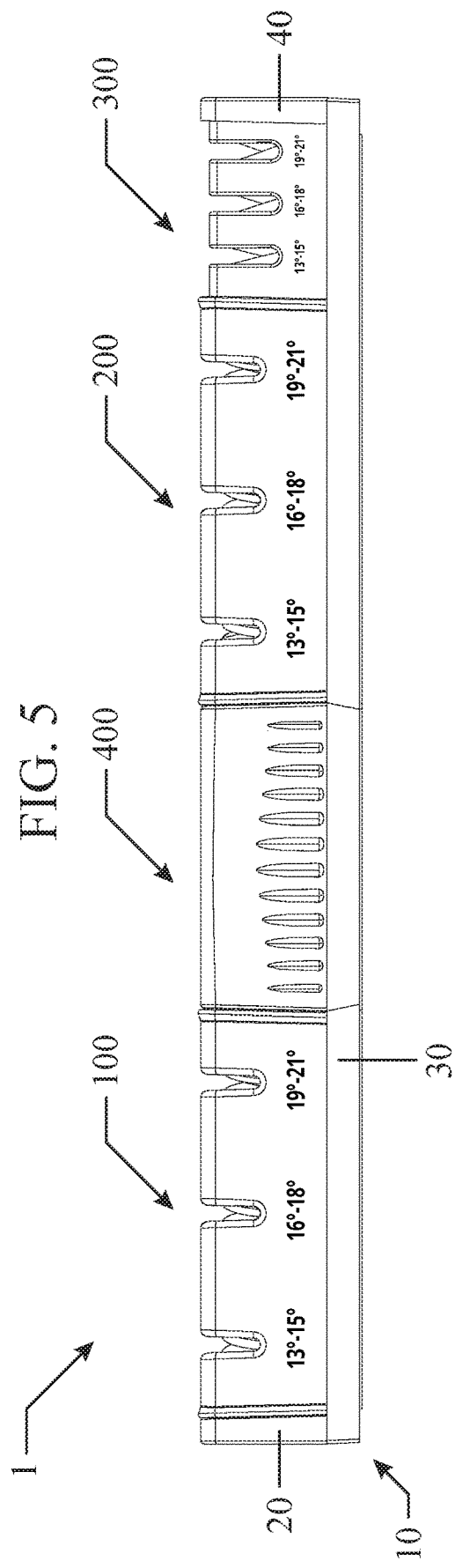

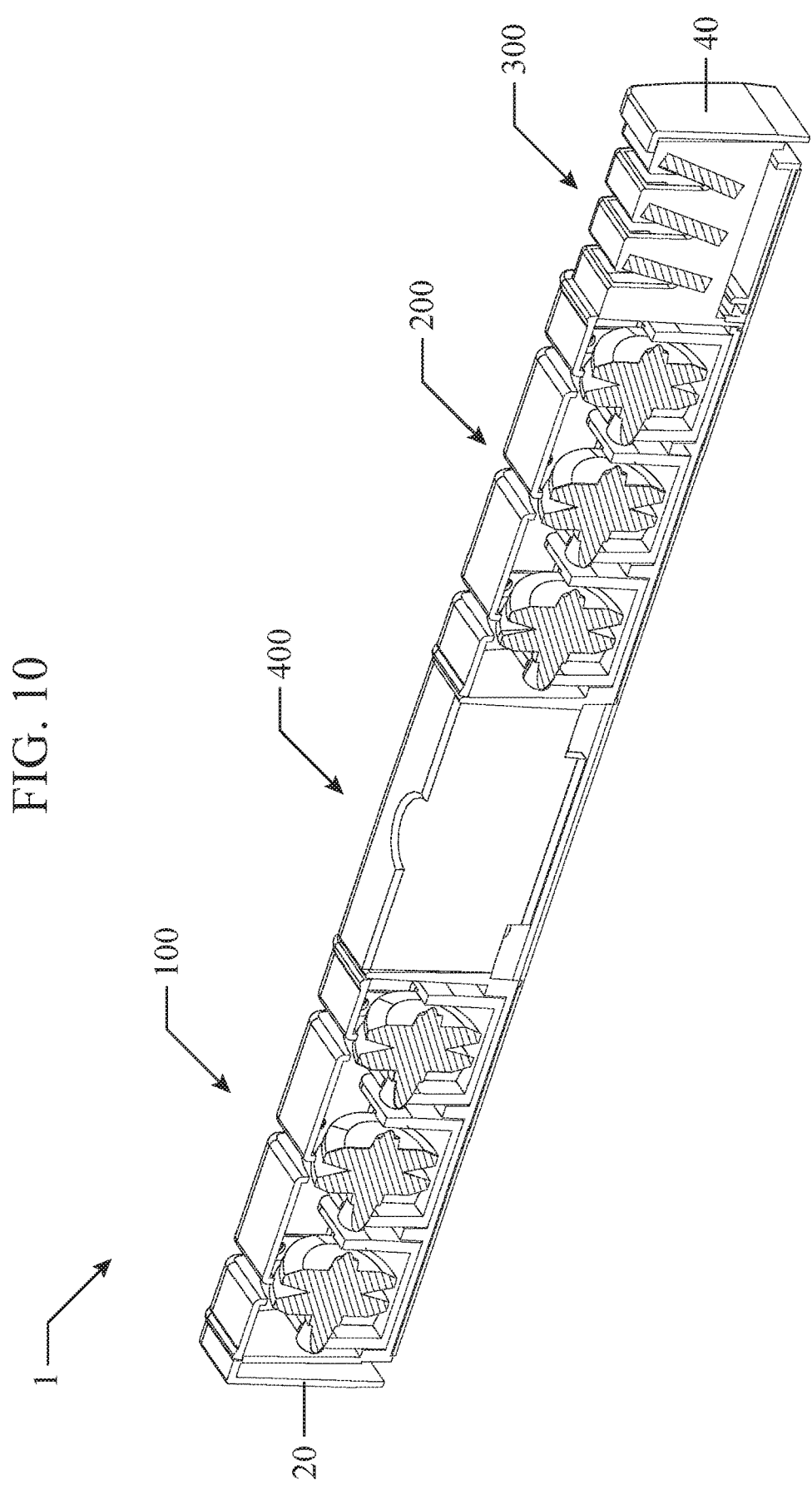

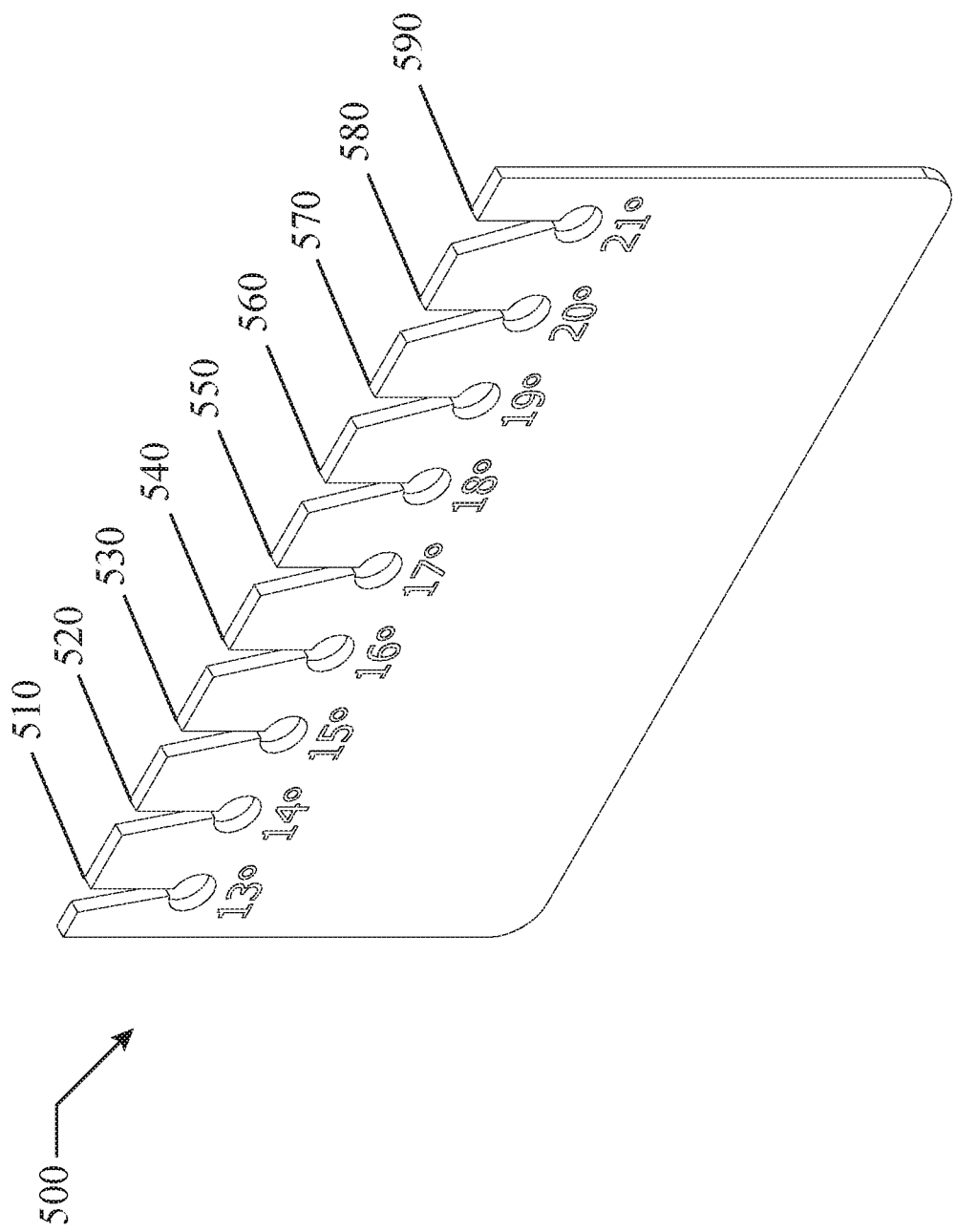

KNIFE GAUGE

CROSS REFERENCE TO RELATED APPLICATIONS

This application is a Divisional Application of U.S. patent application Ser. No. 16/734,039 filed Jan. 3, 2020, which is incorporated by reference in its entirety.

FIELD OF INVENTION

This invention relates to knives, and in particular to systems, devices, and methods for providing different types of sharpeners for knives with an angle gauge to determine which knife sharpener to use for individual knives.

BACKGROUND AND PRIOR ART

Over time there is a need to sharpen blades on knives. It is generally not practical for consumers to use sharpening stones, so the consumers generally look to sharpening devices. Over the years many types of knife sharpening devices have been proposed. See for example, U.S. Pat. No. 3,332,173 to McMastet et al.; U.S. Pat. No. 8,585,462 to Jensen; U.S. Pat. No. 8,590,427 to Murphy et al.; U.S. Pat. No. 8,678,882 to Huber et al.; U.S. Pat. No. 9,168,627 to Elek et al.; 9,333,613 to Friel, Sr. et al. and 10,220,490 to Wu.

However, these devices do not solve all the problems encountered with persons wishing to sharpen different sizes and types of knives. For example, users have difficulty using prior art knife sharpeners since it is unclear what angle sharpening sizes should be used for each knife.

In addition, knife sharpeners are usually limited to only having a few different size knife sharpeners and do not cover most of the different knife blade angles. Still furthermore, more sharpeners only have one type of sharpener such as only having ceramic wheels and not other types of sharpeners.

Thus, the need exists for solutions to the above problems with the prior art.

SUMMARY OF THE INVENTION

A primary objective of the present invention is to provide systems, devices, and methods for providing different types of sharpeners for knives with an angle gauge to determine which knife sharpener to use for individual knives.

A secondary objective of the present invention is to provide systems, devices, and methods for providing ceramic wheel knife sharpeners with diamond coated metal wheel sharpener and tungsten rod knife sharpeners in a single knife sharpener.

A third objective of the present invention is to provide systems, devices, and methods for providing a knife sharpener with a removal knife blade gauge that allows users to determine the desired knife blade angle to be used.

An embodiment of the knife sharpening device, can include an elongated frame, a plurality of different knife angle size sharpeners mounted along the elongated frame, and a removable knife gauge mounted to the elongated frame, wherein the removable knife gauge is removed so that a knife blade angle is determined by the knife gauge.

The plurality of knife blade sharpeners can include a plurality of honing sharpeners. The honing sharpeners can include a plurality of ceramic wheels The plurality of knife blade sharpeners can include a plurality of edge shaving sharpeners. The edge shaving sharpeners can include a plurality of diamond coated metal wheels.

The plurality of knife blade sharpeners can include a plurality of new edge creating sharpeners. The new edge creating sharpeners can include tungsten rods.

The different knife angle size sharpeners can include a plurality of honing sharpeners to straighten the blade edges, a plurality of edge shaving and straightening sharpeners for the blade edges, and a plurality of edge shaving and new edge creating sharpeners for the blade edges.

The plurality of honing wheels can include ceramic wheels.

The plurality of edge shaving and straightening sharpeners can include diamond coated metal wheels.

The plurality of edge shaving and new edge creating sharpeners can include tungsten rods.

The removable angle gauge can include a metal plate having a plurality of grooves with different angles for measuring different knife blade angles. The different angles can be between approximately 13 degrees to approximately 21 degrees.

The grooves can include separate different angles of approximately 13 degrees, approximately 14 degrees, approximately 15 degrees, approximately 16 degrees, approximately 17 degrees, approximately 18 degrees, approximately 19 degrees, approximately 20 degrees and approximately 21 degrees.

A method for determining blade angles for selecting a blade sharpener, can include the steps of: providing knife blade sharpeners that includes: a plurality of honing sharpeners, a plurality of edge shaving sharpeners and a plurality of new edge creating sharpeners, providing a blade angle gauge having a plurality of grooves for measuring blade angle sizes, determining a size of a knife blade with the blade angle gauge, and sliding the knife blade back in forth in a selected one of the knife blade sharpeners until a desired sharpened blade edge is achieved.

The step of providing the blade angle gauge can include the step of providing the blade angle gauge with a plurality of grooves for blade angles between approximately 13 degrees to approximately 21 degrees.

The step of providing the blade sharpeners can include the steps of providing ceramic wheels as the honing sharpeners, providing diamond coated metal wheels as the edge shaving sharpeners, and providing tungsten rods as the new edge creating sharpeners.

A knife blade angle gauge, embodiment can include a planar shaped metal member, and a plurality of grooves along an edge of the member, the plurality of grooves for including angles between approximately 13 degrees to approximately 21 degrees.

The plurality of grooves can include approximately 13 degrees, approximately 14 degrees, approximately 15 degrees, approximately 16 degrees, approximately 17 degrees, approximately 18 degrees, approximately 19 degrees, approximately 20 degrees and approximately 21 degrees.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only.

FIG. 4 is a rear view of the assembled knife sharpener of FIG. 2.

FIG. 5 is a front view of the assembled knife sharpener of FIG. 2.

FIG. 10 is a bottom perspective view of the assembled knife sharpener of FIG. 7 with the bottom cover removed.

FIG. 12 is an enlarged upper front right perspective view of the knife gauge shown in FIG. 1.

DESCRIPTION OF THE PREFERRED EMBODIMENTS

Figure 1:
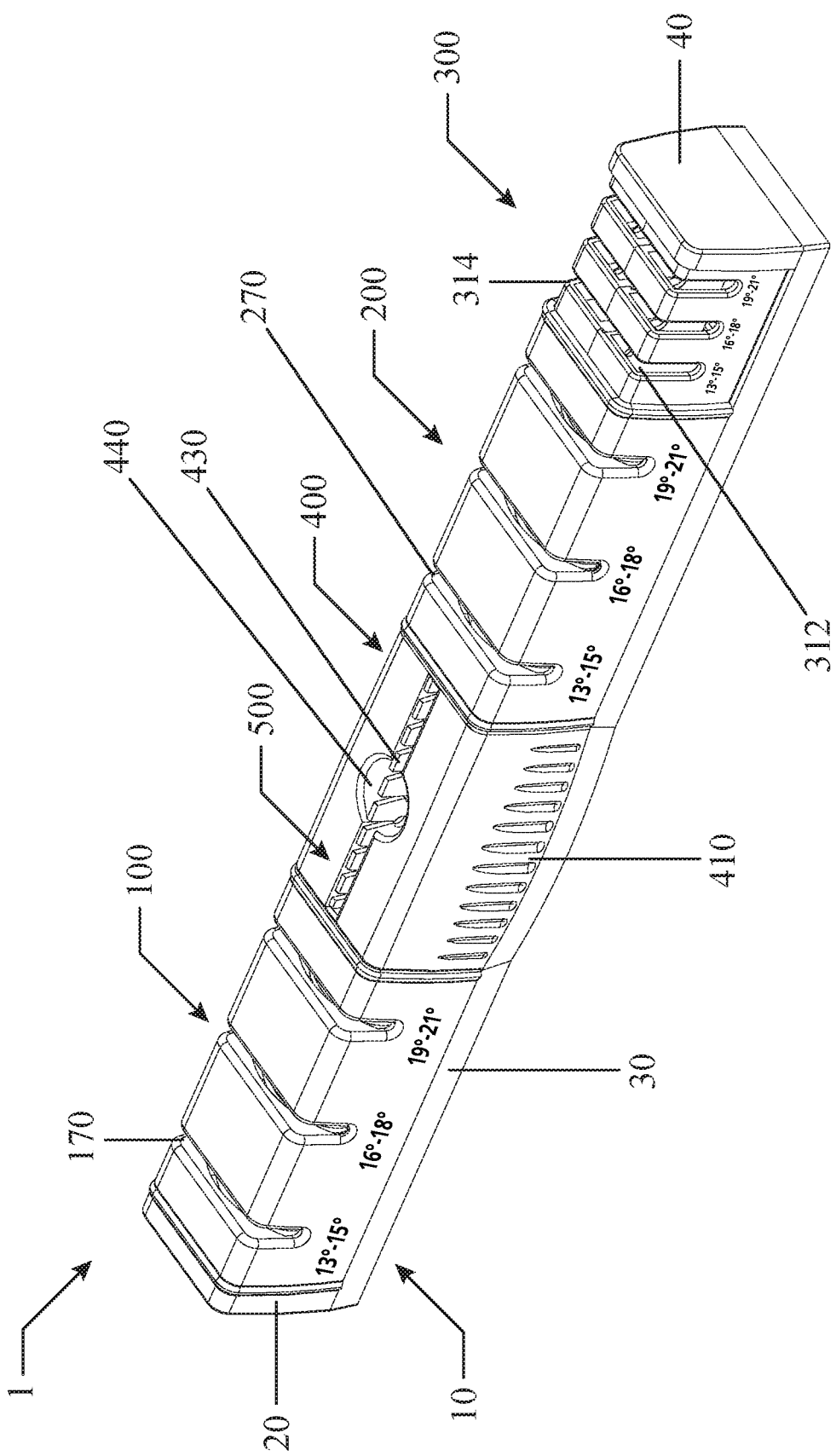
FIG. 1 is an upper front right perspective view of an assembled knife sharpener with the angle gauge mounted in the knife sharpener.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Figure 2:
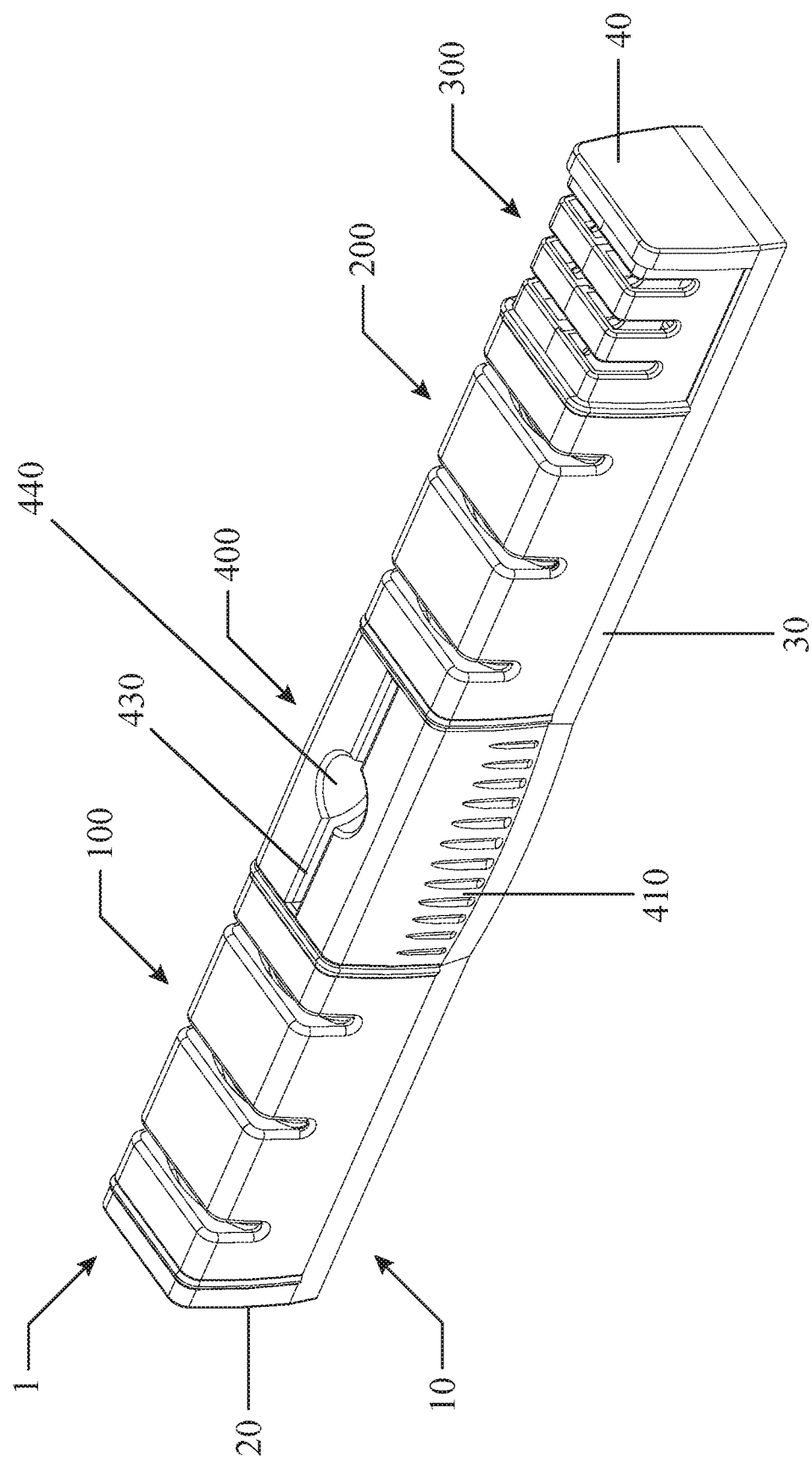
FIG. 2 is another upper front right perspective view of the assembled knife sharpener of FIG. 1 with the angle gauge removed.
Figure 3:
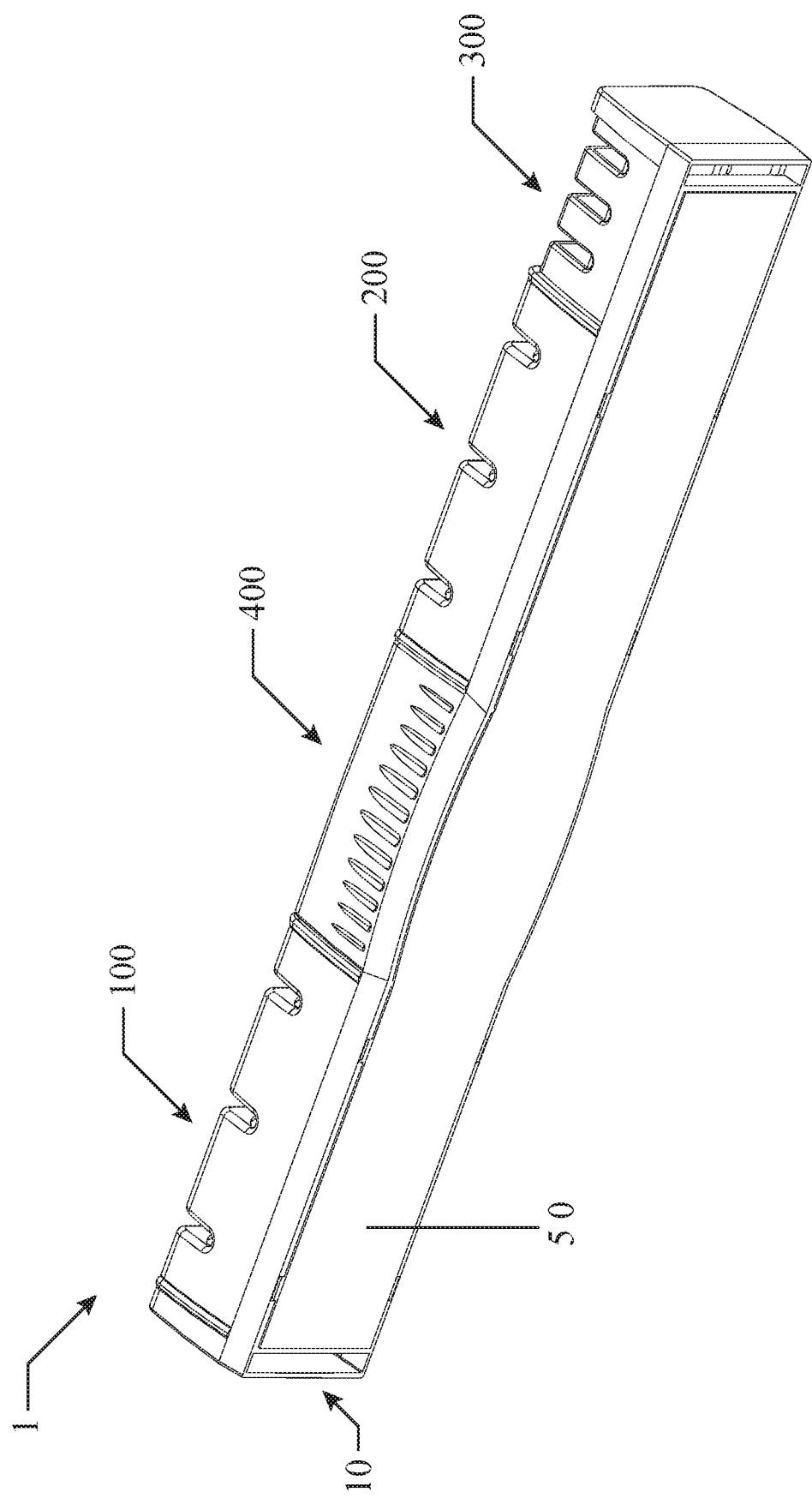
FIG. 3 is a lower front right perspective view of the knife sharpener of FIG. 2.
Figure 6:
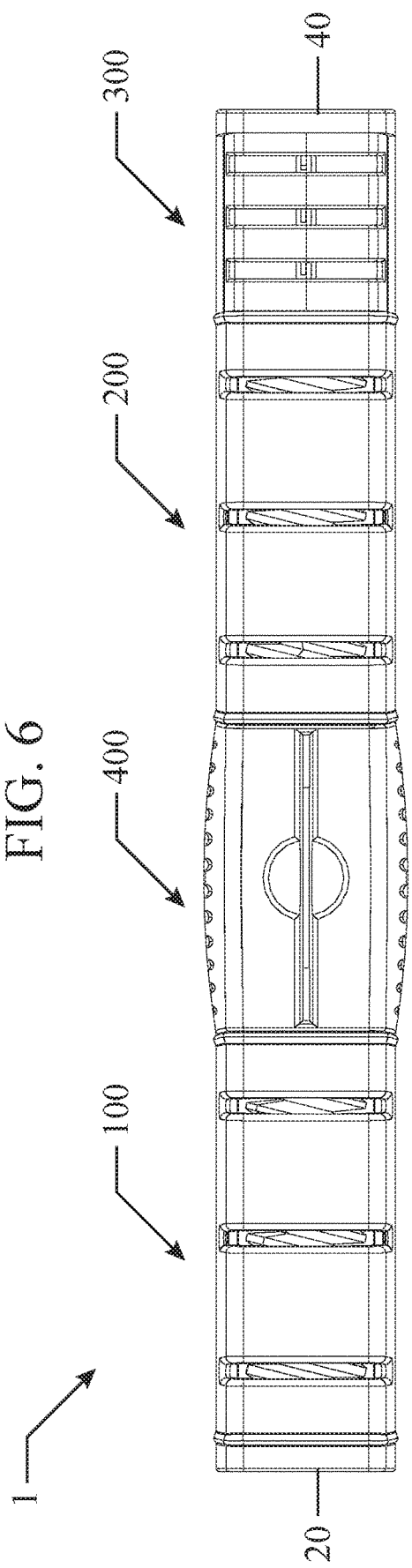
FIG. 6 is a top view of the assembled knife sharpener of FIG. 2.
Figure 7:
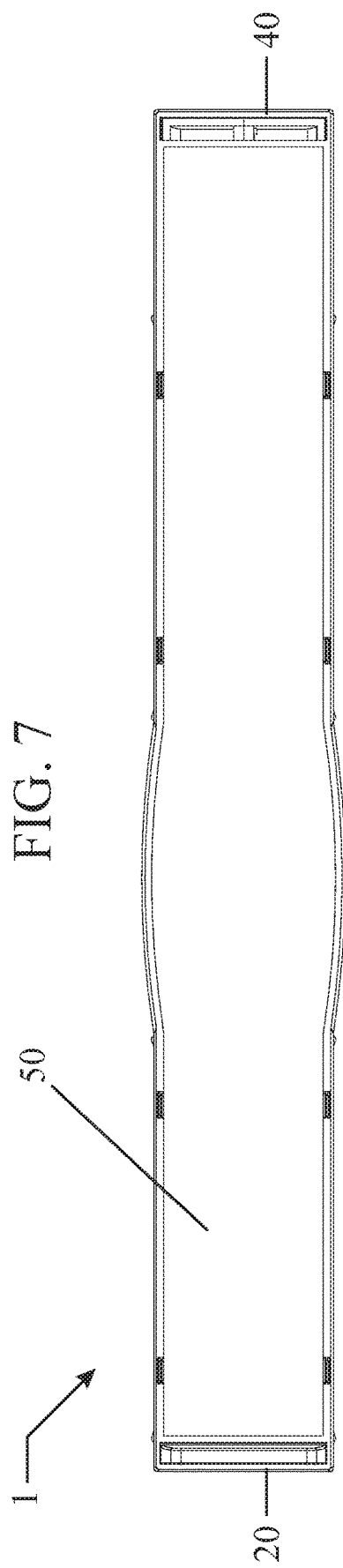
FIG. 7 is a bottom view of the assembled knife sharpener of FIG. 2.
Figure 8:
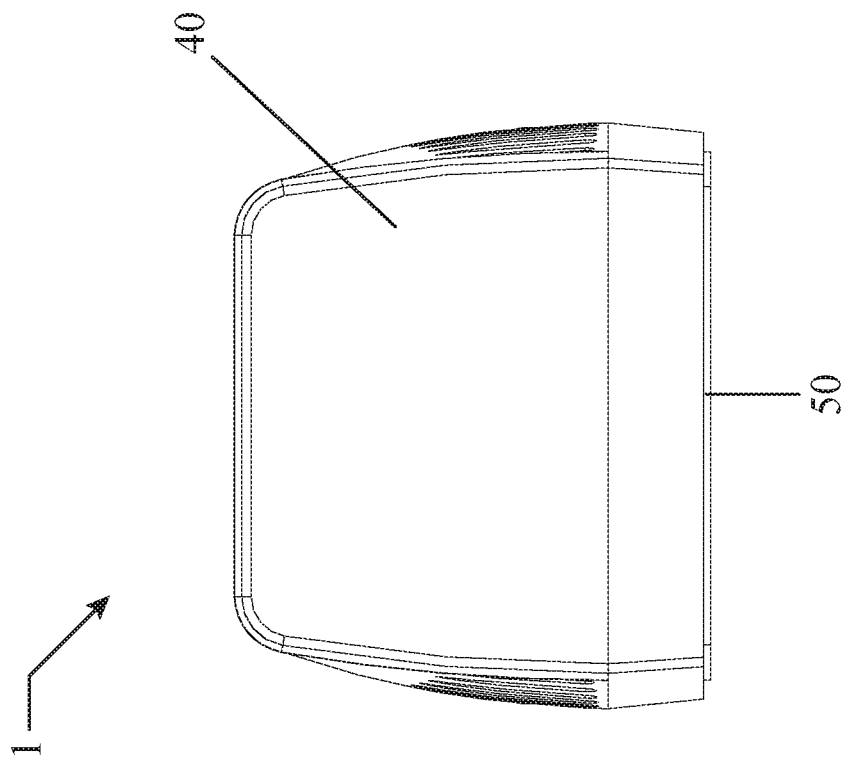
FIG. 8 is a left side end view of the assembled knife sharpener of FIG. 2.
Figure 9:
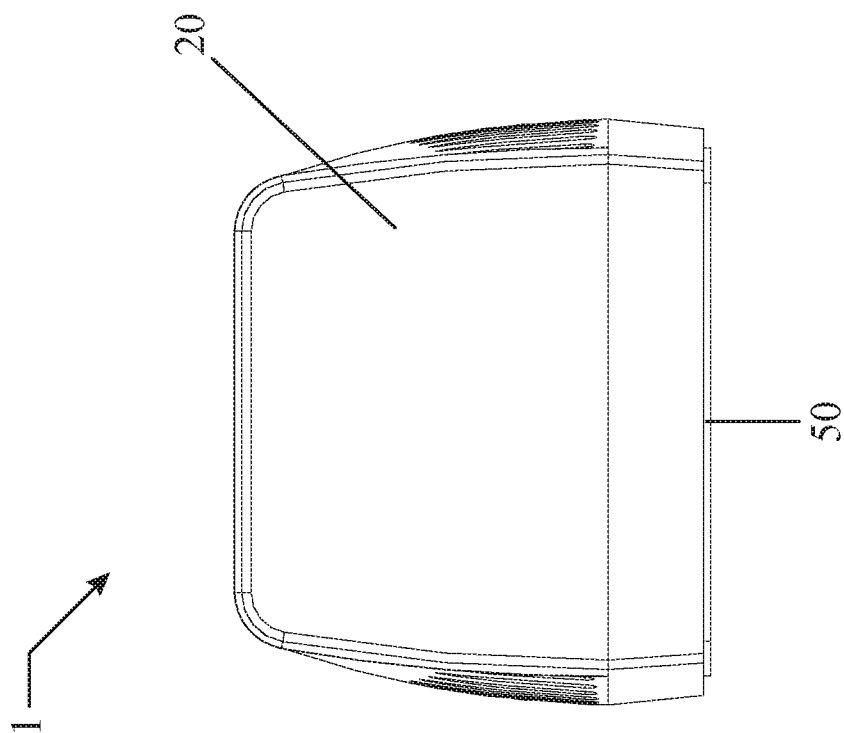
FIG. 9 is a right side end view of the assembled knife sharpener of FIG. 2.

A list of components will now be described.
1 knife sharpener and angle gauge embodiment
10 elongated frame
20 left side of frame
22 step edge
30 main part of frame
32 compartments for honing sharpeners
36 compartments for edge shaving sharpeners
38 compartments for new edge sharpeners
40 right side of frame
42 step edge
50 bottom cover
100 honing sharpeners
110 removable box support
115 off-angle axle support indents
120 dual concentric ceramic wheels
122 inwardly angled inside wheel surfaces
124 V-space formed between wheels
128 axle
150 cover
160 attachment tabs extending below side walls
170 slits for access to wheel sharpeners
200 edge shaving sharpeners
210 removable box support
215 off-angle axle support indents
220 dual concentric metal wheels with diamond coated surfaces
222 inwardly angled inside wheel surfaces 224 V-space formed between wheels
228 axle
250 cover
260 attachment tabs extending below side walls
270 slits for access to wheel sharpeners
300 new edge creating sharpeners
310 front half of housing
312 top slit openings
320 rear half of housing
314 top slit openings
322 indents for tungsten rods
330 tungsten rods
400 housing for angle gauge
410 parallel indents on front and rear side of housing
420 insert with raised protrusions for supporting angle gauge
430 top slit for inserting angle gauge into housing
440 indents for forefinger and thumb to grip angle gauge.
450 insert with raised protrusions for supporting angle gauge upright
470 cavity in housing
500 removable angle gauge
510 13 degree groove, with flat perpendicular rear wall and inwardly angled front wall, and circular opening in bottom of groove
520 14 degree groove, with flat perpendicular rear wall and inwardly angled front wall, and circular opening in bottom of groove
530 15 degree groove, with flat perpendicular rear wall and inwardly angled front wall, and circular opening in bottom of groove
540 16 degree groove, with flat perpendicular rear wall and inwardly angled front wall, and circular opening in bottom of groove
550 17 degree groove, with flat perpendicular rear wall and inwardly angled front wall, and circular opening in bottom of groove
560 18 degree groove, with flat perpendicular rear wall and inwardly angled front wall, and circular opening in bottom of groove
570 19 degree groove, with flat perpendicular rear wall and inwardly angled front wall, and circular opening in bottom of groove
580 20 degree groove, with flat perpendicular rear wall and inwardly angled front wall, and circular opening in bottom of groove
590 21 degree groove, with flat perpendicular rear wall and inwardly angled front wall, and circular opening in bottom of groove
600 first knife
610 blade on first knife
620 second knife
630 blade on second knife FIG. 1 is an upper front right perspective view of an assembled knife sharpener 1 with the angle gauge 500 mounted in the knife sharpener 1. FIG. 2 is another upper front right perspective view of the assembled knife sharpener 1 of FIG. 1 with the angle gauge 500 removed. FIG. 3 is a lower front right perspective view of the assembled knife sharpener 1 of FIG. 2. FIG. 4 is a rear view of the assembled knife sharpener 1 of FIG. 2. FIG. 5 is a front view of the assembled knife sharpener 1 of FIG. 2. FIG. 6 is a top view of the assembled knife sharpener 1 of FIG. 2. FIG. 7 is a bottom view of the assembled knife sharpener 1 of FIG. 2. FIG. 8 is a left side end view of the assembled knife sharpener 1 of FIG. 2. FIG. 9 is a right side end view of the assembled knife sharpener 1 of FIG. 2.

Referring to FIGS. 1-9, the assembled knife sharpener 1 can include an elongated frame 10 as a base with a left side 20, a main part of the frame 30 and a right side 40. Along a upper side of the frame 10 can be plurality of honing sharpeners 100, a central housing 400 for supporting a removable angle gauge 500, a plurality of edge shaving sharpeners 200 and a plurality of new edge creating sharpeners 300. The bottom of the elongated frame 10 can include a removable bottom cover 50.

Referring to FIGS. 1-9, the assembled knife sharpener 1 can have a length of approximately 16 & ⅓", by approximately 2" high by approximately 3 & ¹/₁₀" wide.

FIG. 10 is a bottom perspective view of the assembled knife sharpener 1 of FIG. 7 with the bottom cover 50 removed.

Figure 11A:
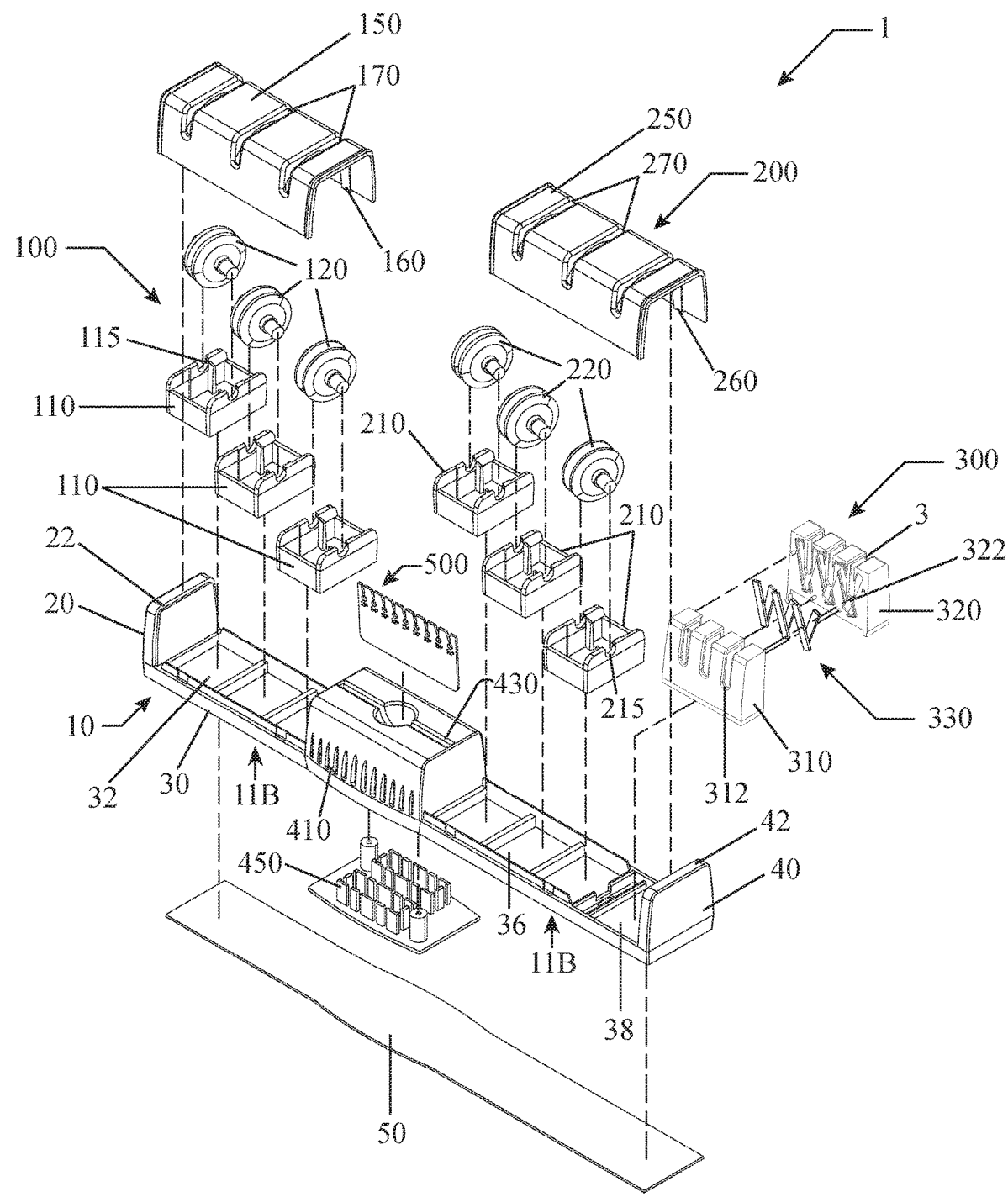
FIG. 11A is an upper front right perspective exploded view of the components of the sharpener and knife gauge of FIG. 1.

FIG. 11A is an upper front right perspective exploded view of the components of the sharpener 1 and knife gauge 500 of FIG. 1.

Figure 11B:
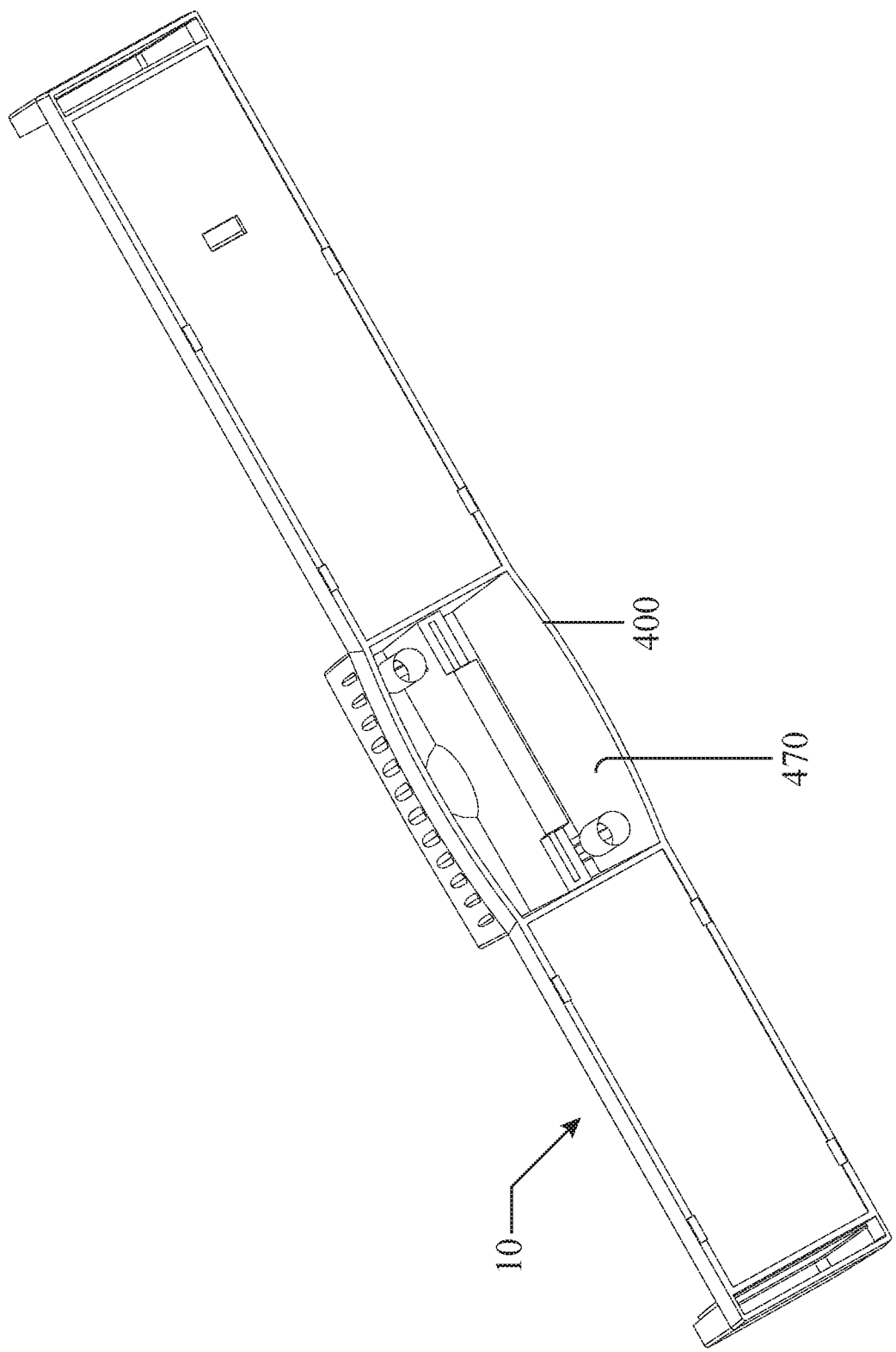
FIG. 11B is a lower front right perspective view of the bottom of the elongated frame of FIG. 11A along arrows 11B.

FIG. 11B is a lower front right perspective view of the bottom of the elongated frame 10 of FIG. 11A along arrows 11B.

Figure 13:
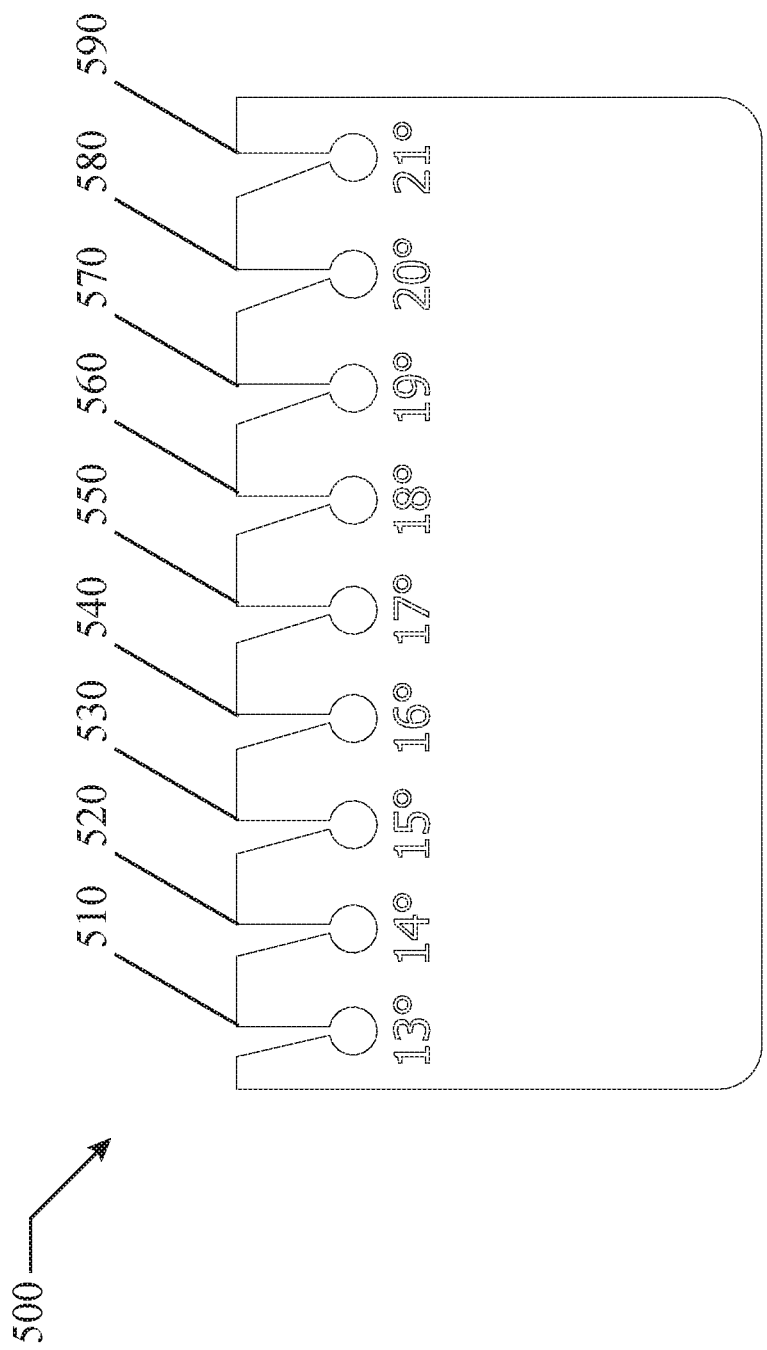
FIG. 13 is a front view of the knife gauge of FIG. 12.
Figure 14:
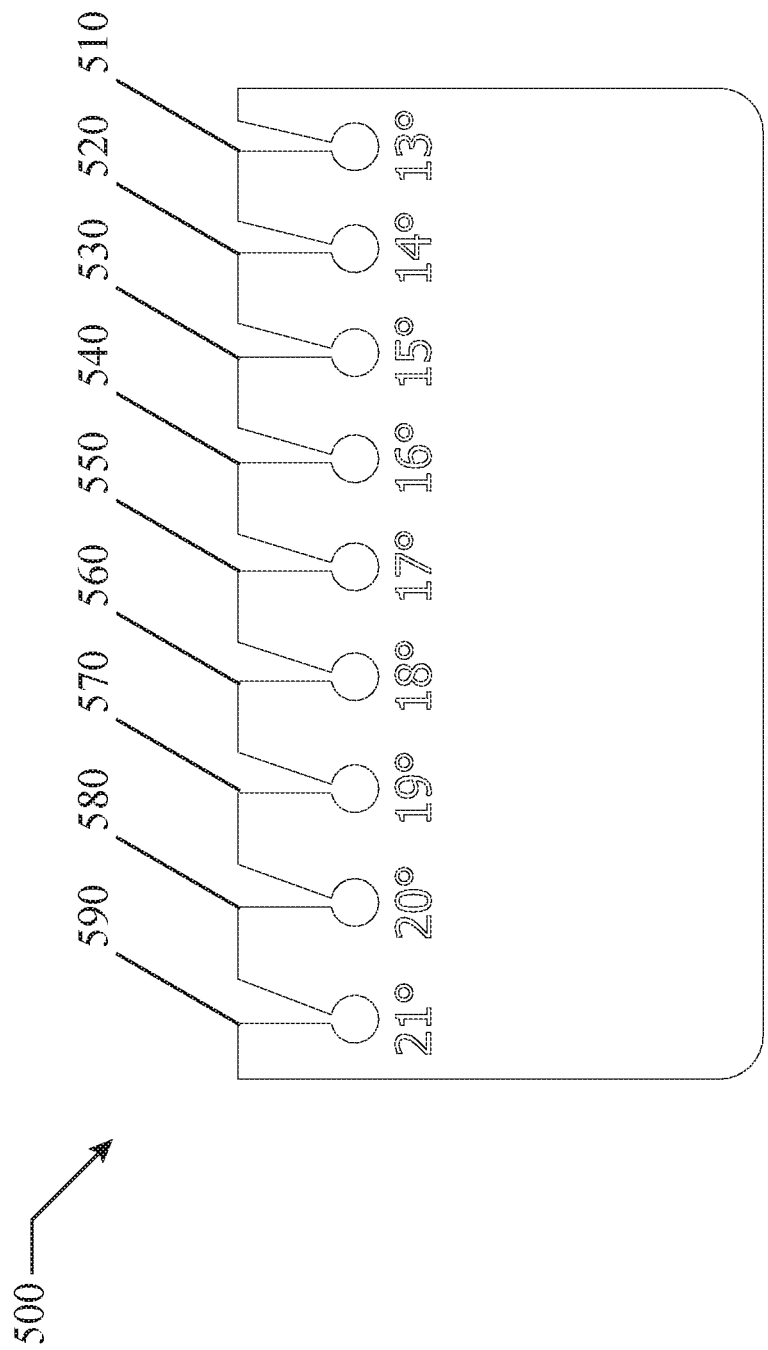
FIG. 14 is a rear view of the knife gauge of FIG. 12.
Figure 16:
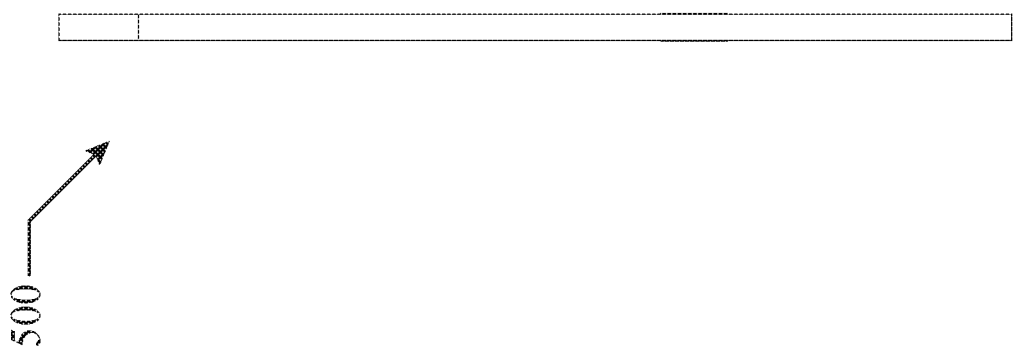
FIG. 16 is a right side view of the knife gauge of FIG. 12.
Figure 15:
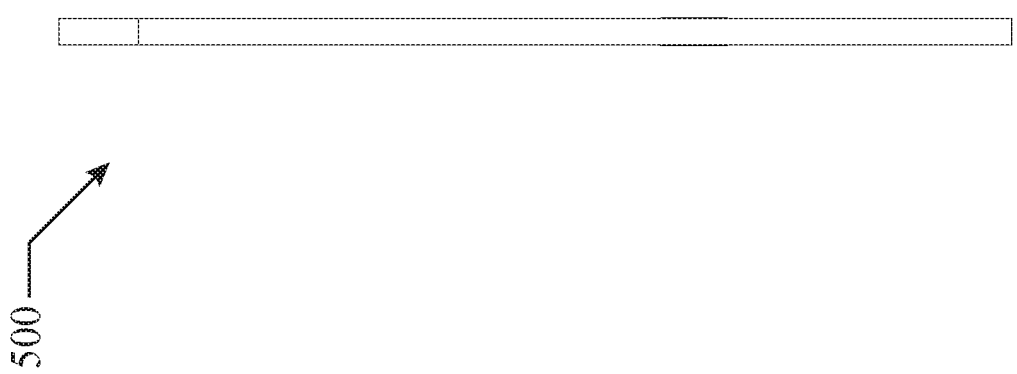
FIG. 15 is a left side view of the knife gauge of FIG. 12.
Figure 17:
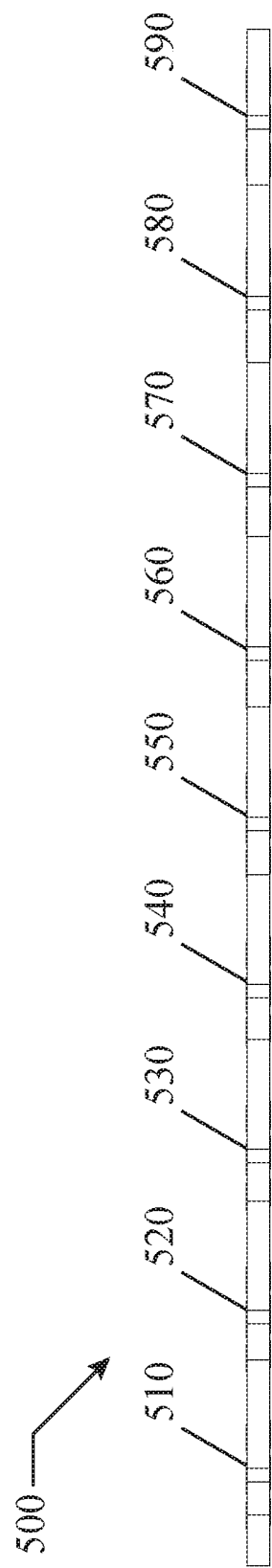
FIG. 17 is a top view of the knife gauge of FIG. 12.
Figure 18:
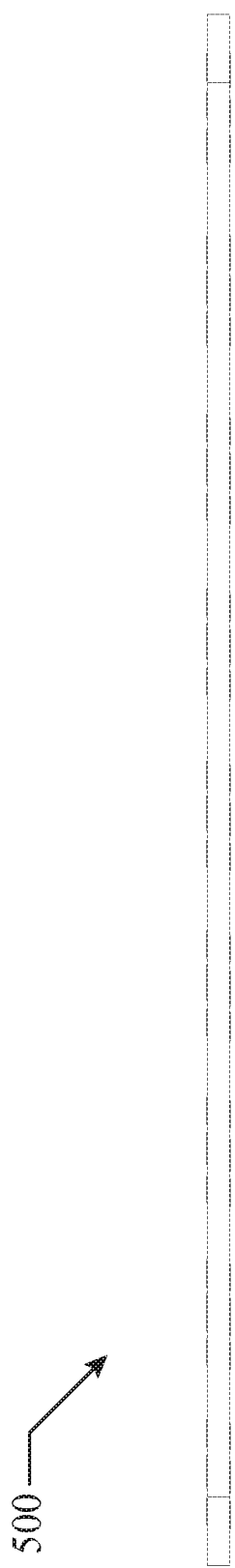
FIG. 18 is a bottom view of the knife gauge of FIG. 12.

FIG. 12 is an enlarged upper front right perspective view of the knife gauge 500 shown in FIG. 1. FIG. 13 is a front view of the knife gauge 500 of FIG. 12. FIG. 14 is a rear view of the knife gauge 500 of FIG. 12. FIG. 15 is a left side view of the knife gauge 500 of FIG. 12. FIG. 16 is a right side view of the knife gauge 500 of FIG. 12. FIG. 17 is a top view of the knife gauge 500 of FIG. 12. FIG. 18 is a bottom view of the knife gauge 500 of FIG. 12.

Referring to FIGS. 1, 2, 11A and 12-18, the removable knife gauge 500 can be formed from a generally rectangular planar piece of metal, such as galvanized steel, and the like, having rounded lower corner edges. The knife gauge can have dimensions of approximately 3 & 4/10" long by approximately 1 & 10/12" high and have a thickness of up to approximately 2/10 cm.

Across the top edge of the gauge can be up to 9 (nine) grooves that include 510 an approximately 13 degree groove, with flat perpendicular rear wall and inwardly angled front wall, and circular opening in bottom of groove, 520 an approximately 14 degree groove, with flat perpendicular rear wall and inwardly angled front wall, and circular opening in bottom of groove, 530 an approximately 15 degree groove, with flat perpendicular rear wall and inwardly angled front wall, and circular opening in bottom of groove, 540 an approximately 16 degree groove, with flat perpendicular rear wall and inwardly angled front wall, and circular opening in bottom of groove, 550 an approximately 17 degree groove, with flat perpendicular rear wall and inwardly angled front wall, and circular opening in bottom of groove, 560 an approximately 18 degree groove, with flat perpendicular rear wall and inwardly angled front wall, and circular opening in bottom of groove, 570 an approximately 19 degree groove, with flat perpendicular rear wall and inwardly angled front wall, and circular opening in bottom of groove, 580 an approximately 20 degree groove, with flat perpendicular rear wall and inwardly angled front wall, and circular opening in bottom of groove, and 590 an approximately 21 degree groove, with flat perpendicular rear wall and inwardly angled front wall, and circular opening in bottom of groove.

The parts in the sharpener can be primarily made from plastic, such as ABS plastic and the like, and can snap together when assembled.

The angle gauge 500 can have permanent type indicia markings of the different angle grooves on both sides to allow the user to select the desired angle groove to use.

Honing Sharpeners

Figure 19:
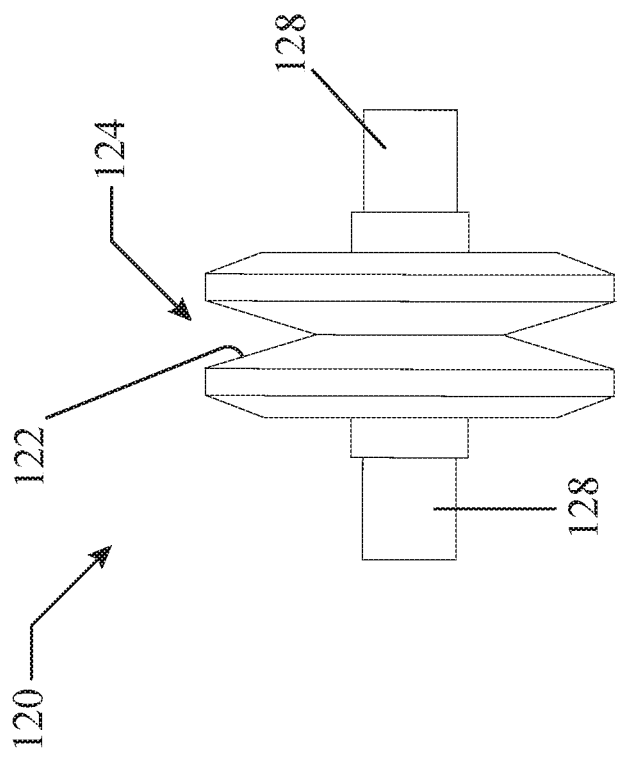
FIG. 19 is an enlarged front right perspective view of one of the honing wheels from FIGS. 11A-11B.
Figure 20:
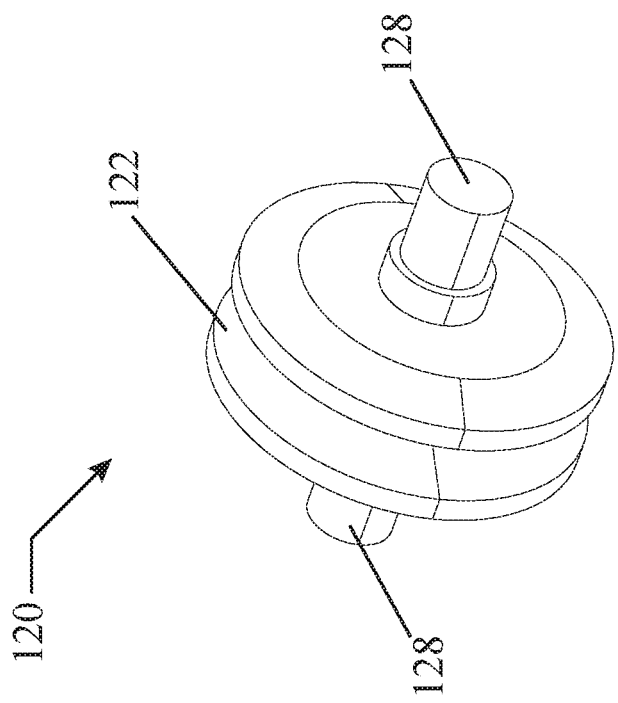
FIG. 20 is a front view of the honing wheel of FIG. 19.

FIG. 19 is an enlarged front right perspective view of one of the honing ceramic wheels 120 from FIGS. 11A-11B. FIG. 20 is a front view of the honing wheels 120 of FIG. 19.

Referring to FIGS. 2, 11A, 19 and 20, a preferred embodiment can include three honing sharpeners, each of these sharpeners can having dual concentric ceramic wheels 120, with inwardly angled inside wheel surfaces 122 forming a generally V shape space between the wheels. Axles 128 can allow for the dual concentric wheels 120 to be freely rotatable on off angle support indents 115 on the top of removable box supports 110. The box supports 110 can fit in individual compartments 32 of a left upper surface of the elongated frame 10.

A cover 150 having sidewalls with downwardly extending tabs 160 that fit within raised edges on the upper surface of the elongated frame 10, can be placed over the honing sharpeners, and slits 170 allow for knife blades to be safely inserted to be sharpened by the dual ceramic wheels 120.

In a preferred embodiment, there can be three sets of dual concentric wheels 120, each having different angle spacing between the wheels for different knife angles. For example, a first dual concentric wheels can cover approximately 13 degrees to approximately 15 degrees, and include 14 degrees. A second dual concentric wheels can cover approximately 16 degrees to approximately 18 degrees and include 17 degrees. And a third concentric dual wheels can cover approximately 19 degrees to approximately 21 degrees and include 20 degrees.

The outside of the different slits 170 can be marked with the different angle blade sizes, such as 14 degrees, 17 degrees and 20 degrees.

Using three sets of concentric wheels 120 can allow for sharpening most kitchen knives that include angles of approximately 13 degrees to approximately 21 degrees.

The honing sharpeners 100 can be used to straighten the knife edge and not to take metal off the blade edge.

Edge Shaving Sharpeners

Figure 22:
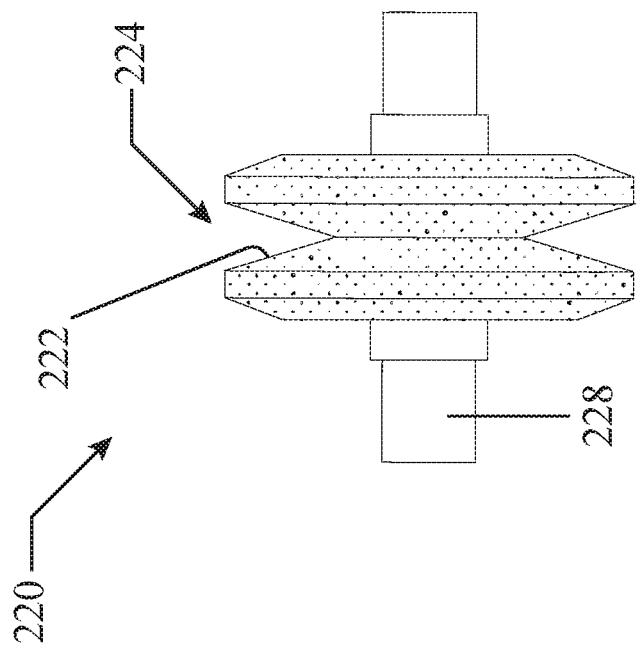
FIG. 22 is a front view of the sharpening wheel of FIG. 21.
Figure 21:
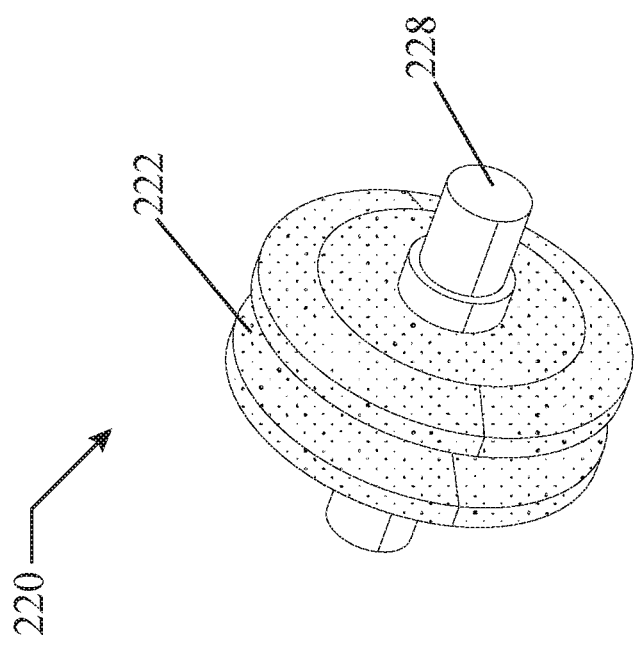
FIG. 21 is an enlarged front right perspective view of one of the sharpening wheels from FIGS. 11A-11B.

FIG. 21 is an enlarged front right perspective view of one of the edge shaving sharpening diamond coated metal wheels 220 from FIGS. 11A-11B. FIG. 22 is a front view of the sharpening wheels 220 of FIG. 21.

Referring to FIGS. 2, 11A, 21 and 22, a preferred embodiment can include three edge shaving sharpeners, each of these sharpeners can having dual concentric ceramic wheels 220, with inwardly angled inside wheel surfaces 222 forming a generally V shape space between the wheels. Axles 228 can allow for the dual concentric wheels 220 to be freely rotatable on off angle support indents 215 on the top of removable box supports 210. The box supports 210 can fit in individual compartments 36 of a right upper surface of the elongated frame 10.

A cover 250 having sidewalls with downwardly extending tabs 260 that fit within raised edges on the upper surface of the elongated frame 10, can be placed over the edge shaving sharpeners, and slits 270 allow for knife blades to be safely inserted to be sharpened by the dual ceramic wheels 220.

In a preferred embodiment, there can be three sets of dual concentric wheels 220, each having different angle spacing between the wheels for different knife angles. For example, a first dual concentric wheels can cover approximately 13 degrees to approximately 15 degrees, and include 14 degrees. A second dual concentric wheels can cover approximately 16 degrees to approximately 18 degrees and include 17 degrees. And a third concentric dual wheels can cover approximately 19 degrees to approximately 21 degrees and include 20 degrees.

The outside of the different slits 270 can be marked with the different angle blade sizes, such as 14 degrees, 17 degrees and 20 degrees.

Using three sets of concentric wheels 220 can allow for sharpening most kitchen knives that include angles of approximately 13 degrees to approximately 21 degrees.

The sharpeners 200 can be used to shave a little metal off the blade edges to sharpen the edges.

New Edge Creating Sharpeners

Figure 23:
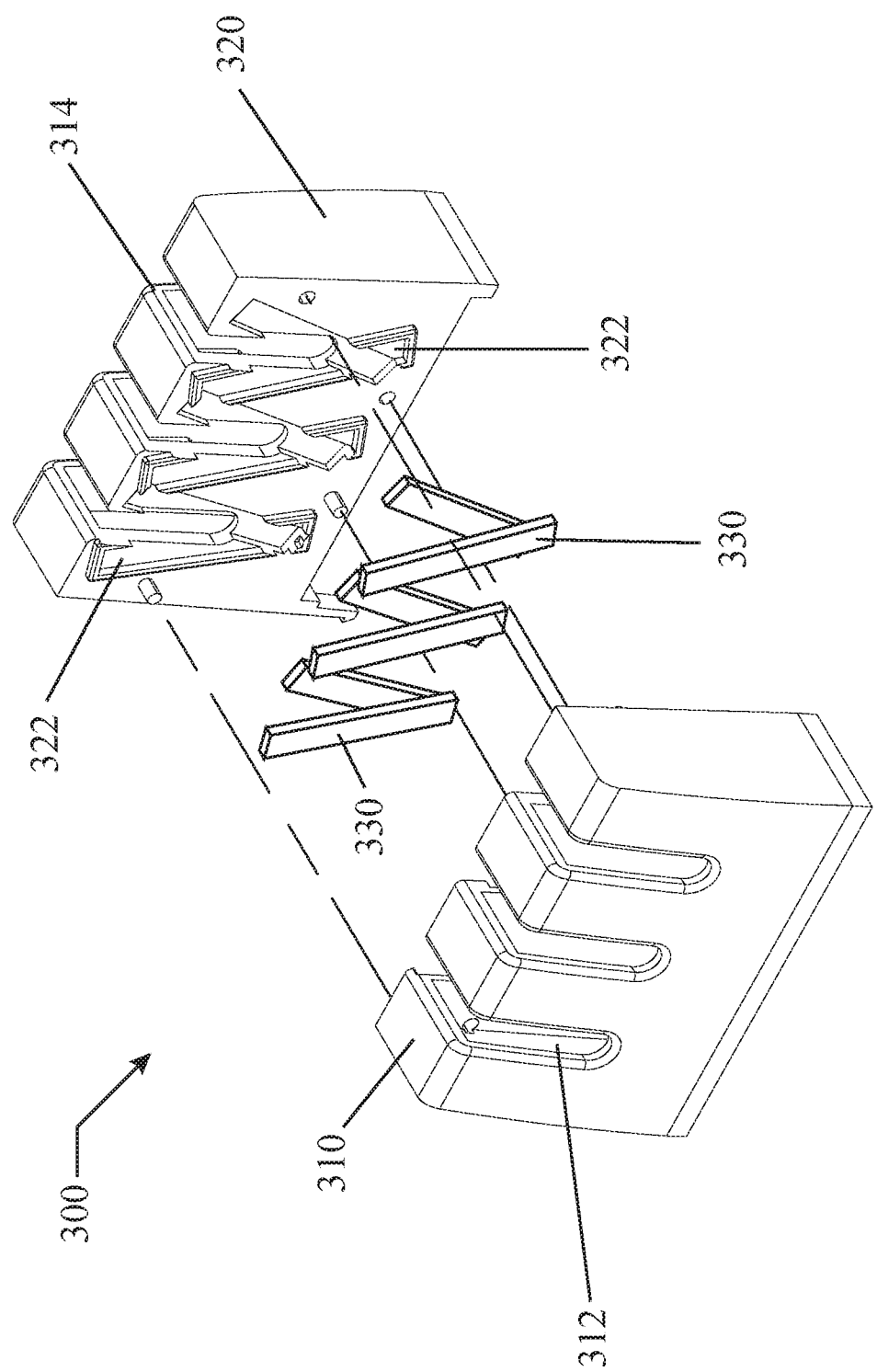
FIG. 23 is an enlarged view of the new edge creating tungsten rods in their housing supports from the FIGS. 11A-11B.
Figure 24:
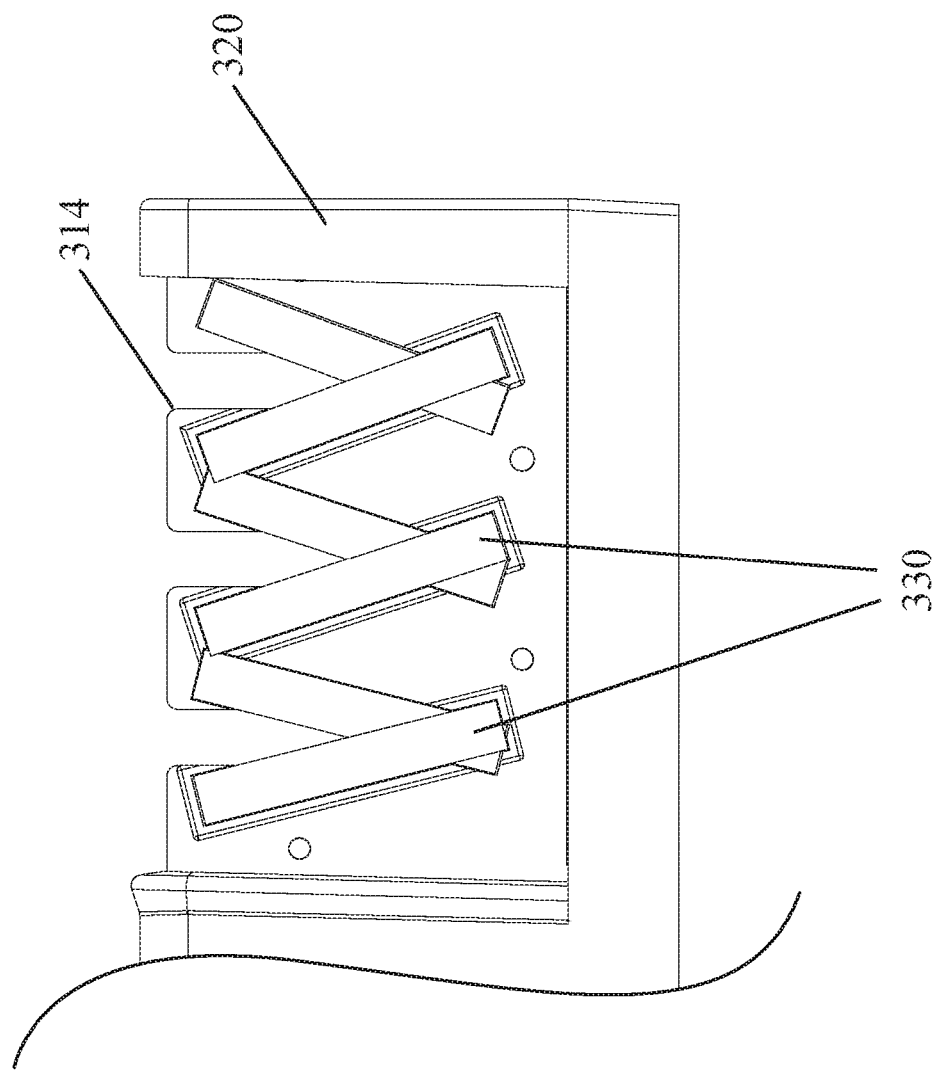
FIG. 24 is a front cross-sectional view of the new edge creating tungsten rods mounted in the rear housing support of FIG. 23.

FIG. 23 is an enlarged view of the new edge creating tungsten rods 330 in their housing supports 310, 320 from the FIGS. 11A-11B. FIG. 24 is a front cross-sectional view of the new edge creating tungsten rods 330 mounted in the rear housing support 320 of FIG. 23.

Figure 26:
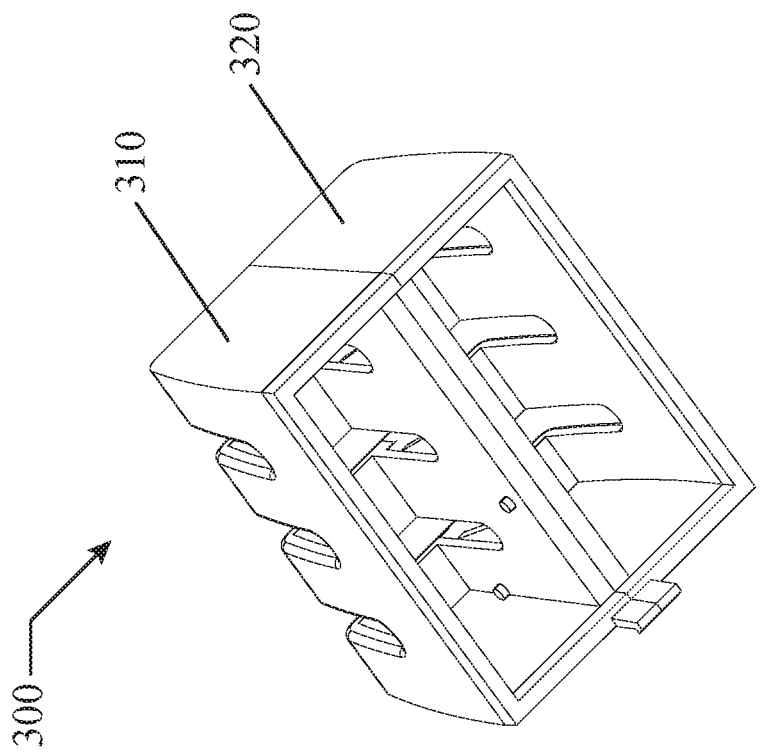
FIG. 26 is a lower front right perspective view of the assembled new edge creating rods mounted in their housing supports of FIG. 24.
Figure 25:
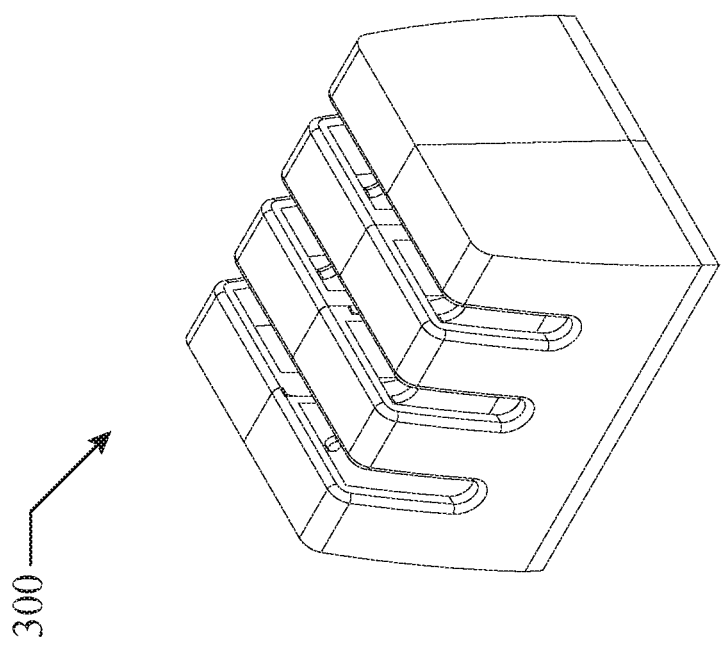
FIG. 25 is an upper front right perspective assembled view of the new edge created tungsten rods mounted in their housing supports.

FIG. 25 is an upper front right perspective assembled view 300 of the new edge created tungsten rods 330 mounted in their housing supports 310, 320. FIG. 26 is a lower front right perspective view of the assembled new edge creating rods 330 mounted in their housing supports 310, 320 of FIG. 24.

Referring to FIGS. 2, 11A and 23-26, the tungsten rods 330 can be mounted in indents 322 in the rear housing support 320, and the front housing 310 can be snapped together to the rear housing 320 so that three sets of slits can be formed between the front housing slits 312 and the rear housing slits 314.

In a preferred embodiment, there can be three total slits, each having different angle spacing between the wheels for different knife angles. For example, a first slit can cover approximately 13 degrees to approximately 15 degrees, and include 14 degrees. A second slit can cover approximately 16 degrees to approximately 18 degrees and include 17 degrees. And a third slit can cover approximately 19 degrees to approximately 21 degrees and include 20 degrees.

The assembled housing 300 can have lower extending edges on each of the housing supports 310, 320 that can snap within a compartment 38 on the upper right surface of the elongated frame 30.

The outside of the different slits 312, 314 can be marked with the different angle blade sizes, such as 14 degrees, 17 degrees and 20 degrees.

The tungsten rods 330 can be used to create a new edge on an old knife blade or a new knife blade. The tungsten rods 330 are arranged in V shaped configurations and are able to put on a new edge after removing the old edge, which results in more sharper edges than the honing sharpeners 100 and edge shaving sharpeners 200.

Figure 27:
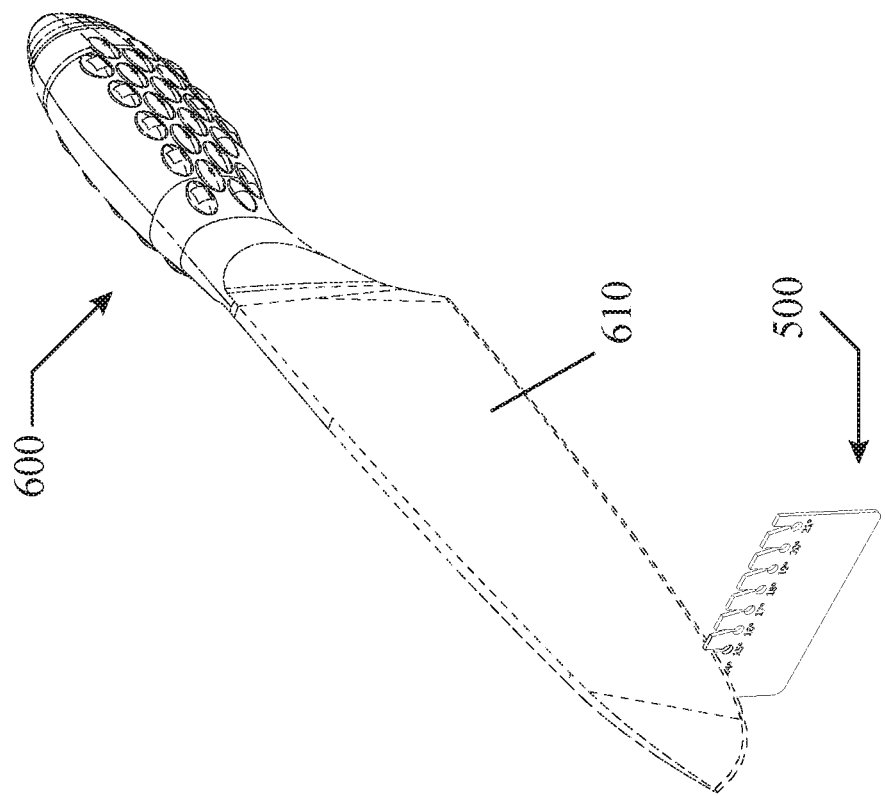
FIG. 27 is a perspective view of a knife blade being inserted into one gauge angle grooves in order to size the knife blade angle.

Referring to FIGS. 1, 2, 11A and 11B, the knife sharpener 1 can include a housing 400 for storing the angle gauge 500. The front and rear sides of the housing 400 can include parallel indents 410 for allowing the knife sharpener 1 to be easily gripped by the user. On top of the housing 400 can include a longitudinal slit 430, and centrally located indents 440 for allowing the user to easily grip and remove the angle gauge 500 when it needs to be used. Underneath the housing 400 can be a cavity 470 with an insert 450 that can be snapped inside. The insert 450 can include raised protrusions for supporting angle gauge upright FIG. 27 is a perspective view of a blade 610 from a knife 600 being inserted into one of the gauge angle grooves in order to size the knife blade 610 angle.

Referring to FIGS. 12-18 and 27, the use of the knife gauge will now be described. The user has a knife with blade and they do not know the blade edge angle. The user will start inserting the blade edge into groove labelled 21 degrees and work their way down. If the blade edge falls into the circle hole the blade angle size is a lesser degree angle than 21 degrees and then the user does the same test with the next lower gauge angle groove until the blade edge stops from being moved into the circular hole, and that is the correct blade angle for the that knife blade edge.

Basically, the user can place the knife edge into each of the selected grooves 510-590 to position the knife edge so that it comes closes to stopping before it passes into the lower circular hole opening. The angle gauge 500 includes grooves 510-590 that cover all angles for knife blades that include kitchen knives, chef knives and cooking knives.

Figure 28:
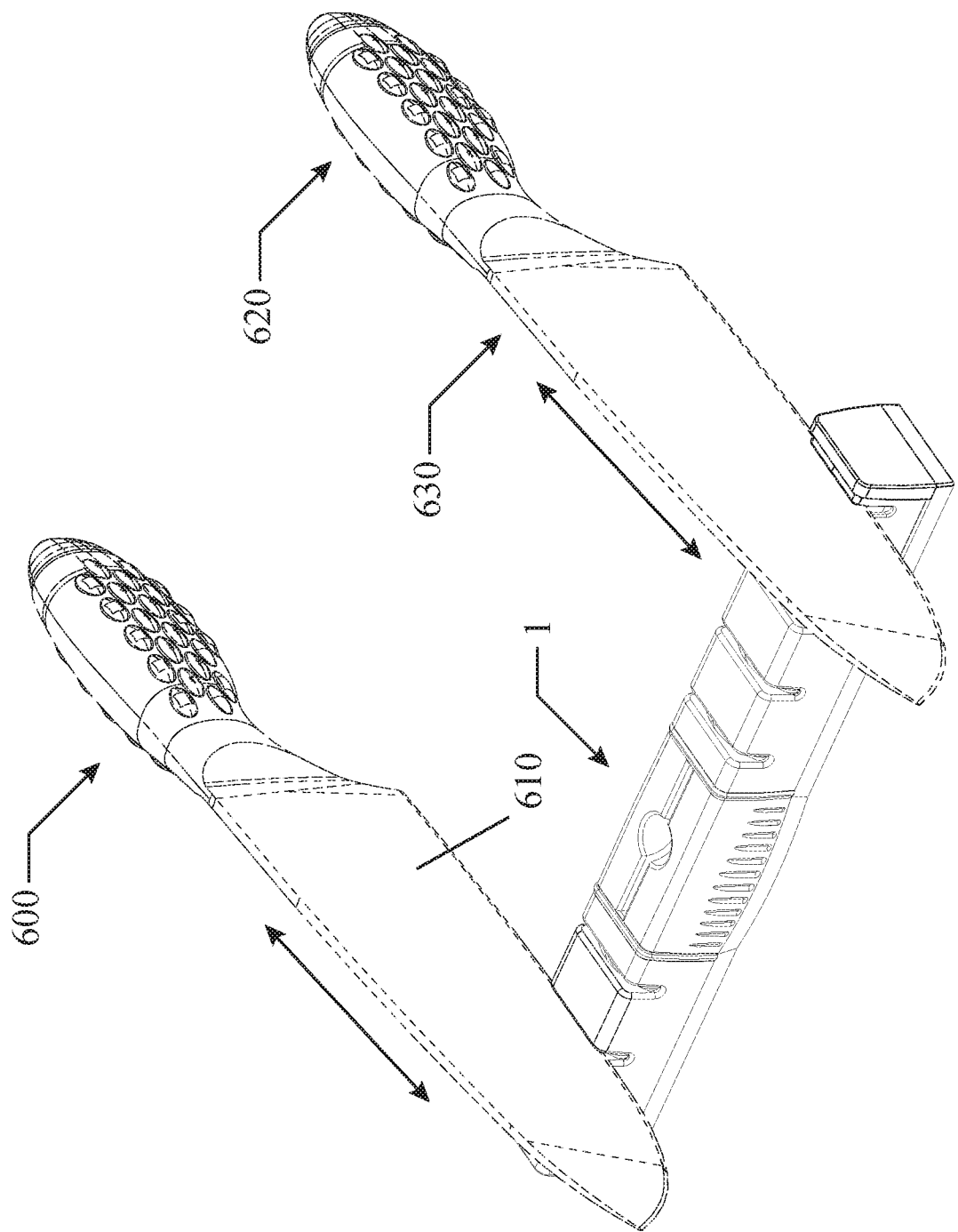
FIG. 28 is a perspective view of two knives having their blades sharpened by selected sharpeners in the assembled knife sharpener.

FIG. 28 is a perspective view of two knives 600, 620 having their blades 610, 630 sharpened by the selected sharpeners 100, 200, 300 in the assembled knife sharpener 1.

Referring to FIGS. 1, 27 and 28, once the user determines the knife blade angle size, the user can then insert the knife blade into the matching blade angle that are labeled in the assembled sharpener 1, and then pick which type of sharpening effect is desired from the honing sharpeners 100, edge shaving sharpeners 200 and new edge creating sharpeners 300. Once the type of sharpener 100, 200, 300 is selected and the particular blade angle size is determined, the user can then place the blade 610, 630 into the selected groove in the sharpener and slides the blade back and forth until the desired sharpened blade is achieved.

The knife sharpener 1 can have different color patterns for the different sharpening sizes that are desired. For example, honing sharpeners 100 can be a green color, edge shaving sharpeners 200 can be blue and new edge creating sharpeners can be orange or red. Other color patterns can be selected.

While the preferred embodiments can have labels for the different sizes, such as 13-15 degrees, 16-18 degrees and 19-20 degrees, other labels can be used on the sharpener, such as but not limited to selected specific angles, and names for the sharpeners, such as honing sharpeners, edge shaving sharpeners, new edge creating sharpeners and the like.

Although the drawings show wheels for honing and edge shaving sharpeners, other types of sharpeners can be used as needed.

Additional feature can be incorporated into the novel invention. For example, the covers for the different sharpeners can be a transparent plastic to allow the user to see the individual sharpeners.

A rubber or elastomeric cover can be placed over the bottom of the sharpener 1 to cover the bottom, and allow the sharpener to not slide on surfaces.

The term "approximately"/"approximate" can be +/−10% of the amount referenced. Additionally, preferred amounts and ranges can include the amounts and ranges referenced without the prefix of being approximately.

While a preferred embodiment shows the angle gauge 500 with nine (9) grooves with specific angle sizes, other angle sizes, and less than or more than 9 grooves may also be possible.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A method for determining blade angles, comprising the steps of:
    providing a metal blade angle gauge with a top edge and flat contiguous bottom edge, with a plurality of separate different sized grooves between approximately 13 degrees to approximately 21 degrees in the top edge for measuring blade angle sizes;
    providing the blade angle gauge with a left edge having a flat contiguous surface extending from the top edge all the way to the bottom edge, and a right edge having a flat contiguous surface extending from the top edge all the way to the bottom edge;
    providing each groove consists of a flat rear wall perpendicular to the bottom edge of the gauge, and an angled front wall having a straight inward angle from the top edge of the gauge to a bottom of the flat rear wall, and a circular opening directly connected to the bottom of the flat rear wall, with a through opening running from the top edge to the circular opening; and
    determining a size of a knife blade by fitting the knife blade into each of the plurality of grooves in the blade angle gauge.

2. The method of claim 1, wherein the determining step includes the step of:
    sliding a blade edge of the knife blade back in forth in a largest one of the grooves to check if the blade edge falls into the circular opening, and repeating the sliding step with each next lower gauge angle groove until the blade edge stops from being moved into the circular hole, and that would be an identified blade angle for the knife blade edge.

3. The method of claim 1, wherein the step of providing the plurality of the grooves include separate different angles of approximately 13 degrees, approximately 14 degrees, approximately 15 degrees, approximately 16 degrees, approximately 17 degrees, approximately 18 degrees, approximately 19 degrees, approximately 20 degrees and approximately 21 degrees.

4. The method of claim 3, wherein the determining step includes the step of:
    sliding a blade edge of the knife blade back in forth in a largest one of the grooves to check if the blade edge falls into the circular opening, and repeating the sliding step with each next lower gauge angle groove until the blade edge stops from being moved into the circular hole, and that would be an identified blade angle for the knife blade edge.

5. The method of claim 1, wherein the providing step includes the step of:

providing the metal gauge from a metal plate with the plurality of grooves with different angles solely along one side of the metal plate for measuring different knife blade angles.

6. The method of claim 5, wherein the step of providing the metal plate with a rectangular shape having dimensions of approximately 3 & 4/10" long by approximately 1 & 10/12" high and have a thickness of up to approximately 2/10 cm.

7. The method of claim 1, wherein the providing step includes the step of:
  providing indicia labelling for the grooves to include: 13 degrees, 14 degrees, 15 degrees, 16 degrees, 17 degrees, 18 degrees, 19 degrees, 20 degrees and 21 degrees.

8. A knife gauge for determining knife blade angle sizes, comprising:
  a rectangular metal plate having a top edge with a plurality of grooves, a flat contiguous bottom plate, a left edge with a flat contiguous surface extending from the top edge all the way to the bottom edge, and a right edge with a flat contiguous surface extending from the top edge all the way to the bottom edge, wherein each groove in the top edge is sized to a different knife blade angle between approximately 13 degrees to approximately 21 degrees, wherein each groove consists of a flat rear wall perpendicular to the bottom edge of the gauge, and an angled front wall having a straight inward angle from the top edge of the gauge to a bottom of the flat rear wall, and a circular opening directly connected to the bottom of the flat rear wall, each groove having a through opening running from the top edge of the gauge to the circular opening.

9. The knife gauge of claim 8, wherein the plurality of grooves include separate different angles of approximately 13 degrees, approximately 14 degrees, approximately 15 degrees, approximately 16 degrees, approximately 17 degrees, approximately 18 degrees, approximately 19 degrees, approximately 20 degrees and approximately 21 degrees.

10. The knife gauge of claim 9, wherein the metal plate includes indicia labelling the grooves to include: 13 degrees, 14 degrees, 15 degrees, 16 degrees, 17 degrees, 18 degrees, 19 degrees, 20 degrees and 21 degrees.

11. The knife gauge of claim 8, wherein the metal plate includes a planar rectangular shape with the flat contiguous left edge, parallel to the flat contiguous right edge.

12. The knife gauge of claim 11, wherein the metal plate includes galvanized steel.

13. The knife gauge of claim 11, wherein the metal plate includes dimensions of approximately 3 & 4/10" long by approximately 1 & 10/12" high and have a thickness of up to approximately 2/10 cm.

14. The knife gauge of claim 8, wherein the metal plate includes indicia labelling the grooves to include: 13 degrees, 14 degrees, 15 degrees, 16 degrees, 17 degrees, 18 degrees, 19 degrees, 20 degrees and 21 degrees.

15. A knife gauge for determining knife blade angle sizes, consisting of:
  a rectangular plate for measuring blade angle sizes,
  sizes between approximately 13 degrees to approximately 21 degrees, the metal rectangular plate includes:
  a top edge having a plurality of grooves and a flat contiguous bottom edge,
  a left edge with a flat contiguous surface extending from the top edge all the way to the bottom edge, and a right edge with a flat contiguous surface extending from the top edge all the way to the bottom edge, wherein each groove in the top edge is sized to a different knife blade angle between approximately 13 degrees to approximately 21 degrees, wherein each groove consists of a flat rear wall perpendicular to the bottom edge of the gauge, and an angled front wall having a straight inward angle inwardly angled from the top edge of the gauge to a bottom of the flat rear wall, and a circular opening directly connected to the bottom of the flat rear wall, each groove having a through opening running from the top edge of the gauge to the circular opening.

* * * * *